United States Patent
Takaragi et al.

[19]

[11] Patent Number: 6,141,421
[45] Date of Patent: Oct. 31, 2000

[54] METHOD AND APPARATUS FOR GENERATING HASH VALUE

[75] Inventors: Kazuo Takaragi, Ebuna; Hiroyuki Kurumatani, Yokohama, both of Japan

[73] Assignee: Hitachi, Ltd., Tokyo, Japan

[21] Appl. No.: 08/986,390

[22] Filed: Dec. 8, 1997

[30] Foreign Application Priority Data

Dec. 10, 1996 [JP] Japan ................................ 8-329741

[51] Int. Cl.$^7$ ............................... H04L 9/30; H04L 9/20
[52] U.S. Cl. ............................... 380/30; 380/43; 380/269
[58] Field of Search ............................. 380/30, 43, 265, 380/269

[56] References Cited

U.S. PATENT DOCUMENTS 5,764,772 6/1998 Kaufman et al. ..................... 380/30

OTHER PUBLICATIONS

ISO/IEC 10118–2, "Information Technology–Security Techniques—Hash Functions: Part 2: Hash–Functions Using an N–Bit Block Cipher Algorithm" (1994).

"The MD5 Message Digest Algorithm" By, R. Rivest, IETF RFC 1321 (1992).

Primary Examiner—Tod R. Swann
Assistant Examiner—Justin T. Darrow
Attorney, Agent, or Firm—Antonelli, Terry, Stout & Kraus, LLP

[57] ABSTRACT

A method and apparatus for generating a highly secured hash value without deteriorating the processing speed is provided. A hash function such that when a message M is given, the message M is compressed so as to have a certain kind of characteristics of cipher is realized. In a step, (1) one to one expanding process so that divided data of the message is inputted and longer data is outputted is executed, and (2) a plurality of cyclic shifting processes in which the number of shifting is different are executed. Consequently, the hash function can be calculated at higher speed than a conventional method of simple repetitive compression of divided data of a message.

7 Claims, 21 Drawing Sheets

METHOD AND APPARATUS FOR GENERATING HASH VALUE

BACKGROUND OF THE INVENTION

The present invention relates to a technique for assuring security in a computer network such as a software library and a transaction system between companies.

Hitherto, for example, with respect to an electronic signature, when the electronic signature (digital signature) for a long message is generated by using only open key ciphers, it takes long time. Consequently, a method of once compressing the message into short data and generating an electronic signature for the compressed data is used. In the method of compression, unlike ordinary data compression, it is unnecessary to reconstruct the original message from the compressed data but the data is compressed so as to have a certain kind of cipher characteristic. The hash function is then considered.

A message of a business transaction document or the like, for example, a document A "Mar. 10, 1996, To Susaki Company, I will purchase a car (catalog No. 1443) at 1,040,000 yen. Yoshiura" is input data to the hash function. The input data can be have any length. The hash function performs a process similar to encipherment to the input data, thereby compressing the data into short data having a predetermined length. For example, a hash value: 283AC9081E83D5B28977 is an output of the hash function. The hash value is also called a message digest or a finger print. Ideally, only one hash value substantially exists in the world for a message. In order to assure that "only one hash value substantially exists in the world", it is said that at least about 128 bits is necessary as the length of the hash value. Specifically speaking, the hash function has to have the following characteristics.

(1) one-way property: When it is assumed that an output value M' of the hash function is given for a message M, another message M(X) which might have the same output value M' as the output value M' should be difficult to be obtained from the viewpoint of the amount of calculation.

e.g. It is assumed that the birthday of Kazuo is February 22nd. In case of finding another person whose birthday is the same as Kazuo's birthday, when the birthday of each of about $(365/2 \approx)$ 183 people is checked, the person can be found. When the people is replaced by a message and the birthday is replaced by a hash value, a similar calculation method can be used. That is, when the length of the hash value is 160 bits, the total number of hash values is $2^{160}$. When messages of $2^{160}/2 = 2^{159}$ are checked on the average, another message having the same hash value as that of a certain message can be found. It is difficult to find another message having the same hash value from the viewpoint of the amount of calculation.

(2) collision free property: It should be difficult from the viewpoint of calculation amount to find two different messages M and M(X) having the same hash value from any messages and hash values.

e.g. When it is desired to find two any persons whose birthday is the same, if the birthdays of about 24 persons are checked on the average, two persons whose birthday is the same can be found. Similarly, when it is assumed that the length of the hash value is 160 bits and two different messages having the same hash value are searched, it is sufficient to check about $2^{160}/2 = 2^{80}$ sets of messages on the average. Although the number is much smaller than that in the case of the one-way property, it is still difficult from the viewpoint of calculation amount.

Various methods of realizing the hash function have been disclosed and a method of repeating substitution and transposition is the mainstream since the processing speed is overwhelmingly faster than a method using the open key cipher. A conventional technique showing the method of the process is disclosed in the following literature.

ISO/IEC 10118-2, "Information technology Security techniques—Hash-functions: Part 2: Hash-functions using an n-bit block cipher algorithm" (1994).

In the conventional technique, as shown in FIG. 21, a message 2501 which is desired to be compressed is first divided into a first division $M_1$ 2502, a second division $M_2$ 2503, . . . each having a predetermined length and the resultant data is inputted to a hash function 2507. In the hash function 2507, a repetitive processing 2505 of substitution and transposition is performed to the first division $M_1$ 2502 by using an initial value 2504 as a parameter, thereby obtaining a first intermediate output. Subsequently, by performing the repetitive processing 2505 of substitution and transposition to the second division $M_2$ 2503 by using the intermediate output as a parameter, a second intermediate output is obtained. Such processes are repeated and a final intermediate output is used as a hash value H 2506 to be obtained.

In the repetitive processing 2505 of substitution and transposition, an enciphering function such as DES (Data Expansion Standard) is used. The function is called "a hash function using a block cipher", standardized by ISO, and disclosed in the above-mentioned literature of the conventional technique. The details of the method are as follows.

An enciphering function 2509 is applied to the first division $M_1$ 2502 by using data obtained by transforming the initial value 2504 with a transforming function 2508, thereby enciphering the first division $M_1$ 2502. The exclusive OR 2510 is obtained every bit between the result of encipherment and the first division $M_1$ 2502 and is used as an intermediate output of the repetitive processing 2505 of substitution and transposition. The intermediate output is fed back to the repetitive processing 2505 of substitution and transposition and the enciphering function 2509 is applied to the second division $M_2$ 2503 by using data obtained by transforming the input data with the transforming function 2508, thereby performing the enciphering process. The exclusive OR 2510 between the enciphered data and the second division $M_2$ 2503 is obtained every bit and is used as an intermediate output of the repetitive processing 2505 of substitution and transposition. Such processes are repeated and the final intermediate output is used as the hash value H 2506 to be derived.

When the DES is used as the enciphering function 2509, the length of each of the first division $M_1$ 2502, the second division $M_2$ 2503, . . . is 64 bits, the length of the output of the repetitive processing 2505 of substitution and transposition is 64 bits, and the length of the hash value H 2506 is also 64 bits. The feature of the "hash function using the block cipher" is that the length of each of the divisions $M_1$ 2502, $M_2$ 2503, . . . is equal to the length of the output of the repetitive processing 2505 of substitution and transposition.

In the repetitive processing 2505 of substitution and transposition, methods which do not use the enciphering function 2509 such as DES are called "dedicated hash functions". There are SHA-1, RIPEMD-160, etc. which are being standardized by the internet standards MD5 and ISO.

Among them, MD5 is disclosed in "The MD5 Message Digest Algorithm", by R. Rivest, IETF RFC 1321 (1992).

In MD5, the message 2501 is divided into parts each having the length of 512 bits, thereby obtaining the first division $M_1$ 2502 of 512 bits, the second division $M_2$ 2503 of 512 bits, . . . . The resultant data is inputted to the hash function 2507. In the hash function 2507, the repetitive processing 2505 of substitution and transposition is performed to the first division Ml 2502 of 512 bits by using the initial value 2504 of 128 bits as a parameter, thereby obtaining the intermediate output of 128 bits. Subsequently, the repetitive processing 2505 of substitution and transposition is performed to the second division $M_2$ 2503 of 512 bits by using the derived intermediate output as a parameter, thereby obtaining an intermediate output of 128 bits. Such processes are repeated and the final intermediate output of 128 bits is used as the hash value H2506.

The feature of the "dedicated hash function" is that the length of the output of the repetitive processing 2505 of substitution and transposition is shorter than the length of each of the divisions $M_1$ 2502, $M_2$ 2503, . . . of the message.

The processing speed of MD5 is high and is 1,000 times as fast as that of the open key cipher. For example, data of about 100,000 bits is compressed by software on a personal computer using Pentium 90 MHz in about 1 milli-second (1/1000 second). Consequently, the electronic signature can be generated at high speed for a relatively long sentence or a figure.

The above known technique has, however, the following drawbacks.

(1) The processing speed of the hash value generated by the "hash function using the block cipher" is low.

The length of the input and that of the output to/from the enciphering function (block cipher) such as DES which can be used in the hash function is 64 bits which is short. The hash value obtained is consequently 64 bits which is not sufficiently long to realize the collision free property. Therefore, the hash value of 128 bits is generated by executing the calculation of the hash function twice by changing the initial value and the like, but a problem of slow processing speed occurs.

(2) It is feared that the hash value generated by the "dedicated hash function" is insufficient from the viewpoint of security.

As mentioned above, in the "dedicated hash function", the simple repetitive processing 2505 of substitution and transposition is performed to the data obtained by dividing the message. In this case, the length (for example, 128 bits) of the output value is shorter than the length (for example, 512 bits) of the input value. Consequently, input collision such that the same output is obtained from different two inputs can be relatively easily caused by paying attention to the relation between the message division data input of 512 bits and the compressed data output of 128 bits. That is, the hash function can be relatively easily broken.

SUMMARY OF THE INVENTION

It is, therefore, a main object of the invention to provide a method and apparatus for generating a hash value in which the security is increased while the processing speed is not reduced.

A specific object of the invention is to generate a hash value having a long length of bits at high speed by a personal computer constructed by a general microcomputer, for example, to enable a hash value of 256 bits to be generated by calculating a few cycles of internal clocks.

(1) As mentioned above, an object of the invention is to realize generation of a hash function at high speed.

In a processing step of the hash function, for example, both of a cyclic shifting process ($A=rot_5(X_L+H_2+1)$, $C=B+$ $rot_{12}(B)+1$) to 32-bit data and an integrating operation between 32-bit data and 32-bit data (process of $E=C \cdot D+Y_2$) are used. It is effective to efficiently scramble the data by the following reason. Although the cyclic shifting realizes the transposition of data of 32 bits by one process, a recent microprocessor, for example, Pentium® of Intel Corporation completes the cyclic shifting in one cycle. Pentium of 100 MHz executes one hundred million times of cyclic shifting in one second. The processing speed is forty times as high as that of the 68020 processor of 20 MHz which can execute only about 2,500,000 times of the cyclic shifting in one second. The integrating operation between 32-bit data and 32-bit data, that is, (32-bit data×32-bit data=64-bit data) is very effective substitution when the data scrambling degree in which all of the bits of an output is influenced by the bits of an input is enhanced. Pentium of 100 MHz executes the integrating operation ten million times in one second. The processing speed is twenty times as high as that of the 68020 processor of 20 MHz which can execute the integrating operation only about five hundred thousand times in one second. One of the features of the invention is that the fundamental arithmetic operation of a microprocessor which is especially advantageous by recent technical innovations is used in the processing of the transposition and substitution. Consequently, the calculation of the hash function can be realized at high speed. With respect to addition of data of 32 bits and data of 32 bits which is conventionally often used in a substituting process, pentium of 100 MHz executes the addition one hundred million times in one second. The processing speed is only ten times as fast as that of the 68020 processor of 20 MHz which executes the adding operation about ten million times in one second. When the fact that the multiplication has data scrambling effect of addition of 32 times and the shifting of 32 times is considered, it can be said that the advantage of multiplication is increased more than addition in the age of Pentium.

(2) It is another object of the invention to realize a safe (highly secured) hash function.

According to the conventional technique of FIG. 21, when the length of each division of the message inputted to the repetitive processing 2505 of substitution and transposition is compared with the length of the intermediate output, the length of the input is equal to that of the output ("hash function using the block cipher") or the length of the input is longer than that of the output ("dedicated hash function"). On the contrary, according to the invention, the length of an input unit of the message is shorter than the length of an output and a process for performing a one to one expansion transformation such that when input values are different, output values are always different is included. Consequently, the collision of messages in the repetitive processing 2505 of substitution and transposition, which is a problem in MD5, can be relatively easily avoided.

(3) It is further another object of the invention to realize a hash function in which an initial value has high collision free property. In the conventional technique, after the initial value 2504 is first processed, it is not subjected to any process. On the contrary, according to the invention, an initial value processed first is subjected to a process in a data expanding part and is again inputted to an input part to which an input unit of a message of a one to one expanding part is also inputted. Thus, collision of the initial values such that the same hash value is derived from different initial values does not easily occur.

(4) It is further another object of the invention to realize a hash function having high collision free property of a message. According to the conventional technique, after divisions $M_1$ 2502, $M_2$ 2503, . . . of a message are once processed, they were not subjected to any process. On the contrary, according to the invention, the divisions are again inputted to the same input part generally K times. Consequently, collision of the messages such that the same hash value is derived from different messages does not easily occur.

(5) It is further another object of the invention to compound various functions of the hash function. Hitherto, the open key cipher and a common key cipher and data compression are provided as separate functions. That is, conventionally, when it is desired to compress a message and send ciphers, the following processes are separately executed; (a) a session key generated by generating a random number is enciphered by an open key enciphering function and the resultant data is distributed to a receiver, (b) a message is compressed by a data compressing function, and (c) the compressed message is enciphered by the session key and the common key enciphering function and the resultant data is sent to the receiver. On the contrary, according to the invention, the open and common key ciphers and the data compression are combined so as not to be separated, thereby enabling those three functions to be simultaneously effectively realized.

In order to solve the problems of the conventional technique, the invention employs the following means.

(1) According to the conventional technique, when the length of the division of the message inputted to the repetitive processing 2507 of substitution and transposition is compared with the length of the intermediate output to be generated, the length of the output is equal to the length of the input ("hash function using the block cipher") or the length of the output is shorter than the length of the input ("dedicated hash function"). On the contrary, according to the invention, the length of the output is longer than that of the input and the process for executing the one to one expansion transformation so that when input values are different, output values are always different is included. Consequently, the collision of the messages in the repetitive processing 2505 of substitution and transposition, which is the problem in MD5, can be relatively easily avoided.

(2) The one to one expansion transformation includes the process for executing multiplication to the data obtained by transforming the input value and the process for executing a plurality times of cyclic shifting calculation in which shift values are different. Consequently, the cyclic shifting calculation and the multiplication whose processing speed is particularly improved in association with the advancement of recent microprocessors such as Pentium can be effectively used to scramble data. That is, the multiplication and the cyclic shifting calculation are used in the calculation of the hash function so that the calculation of the hash function can be remarkably improved.

(3) In the conventional technique, after the initial value 2504 is first used as a parameter, the initial value 2504 is not subjected to any process. On the contrary, according to the invention, the initial value 2504 used first as a parameter is again inputted to the same input part to which the message 2501 is inputted. Consequently, the collision of the initial values such that the same hash value is derived from different initial values does not easily occur.

(4) In the conventional technique, after the divisions $M_1$ 2502, $M_2$ 2503, . . . of the message are once processed, they are not used in any processes. On the contrary, according to the invention, the divisions of the message once processed are again inputted to the same input part later. Consequently, the collision of the messages such that the same hash value is derived from different initial values can be suppressed.

The methods of the invention can be realized by software (computer program). The program can be stored in a recording medium such as a hard disk drive and can be distributed in a form stored in a portable recording medium such as ROM, CD-ROM, flexible disk, or the like. The program realizing the invention can be also loaded via a network into an apparatus executing the program.

The above and other objects and features will become more apparent from the following preferred embodiments described with reference to the appended drawings.

DETAILED DESCRIPTION OF THE PREFERRED EMBODIMENTS

Figure 1:
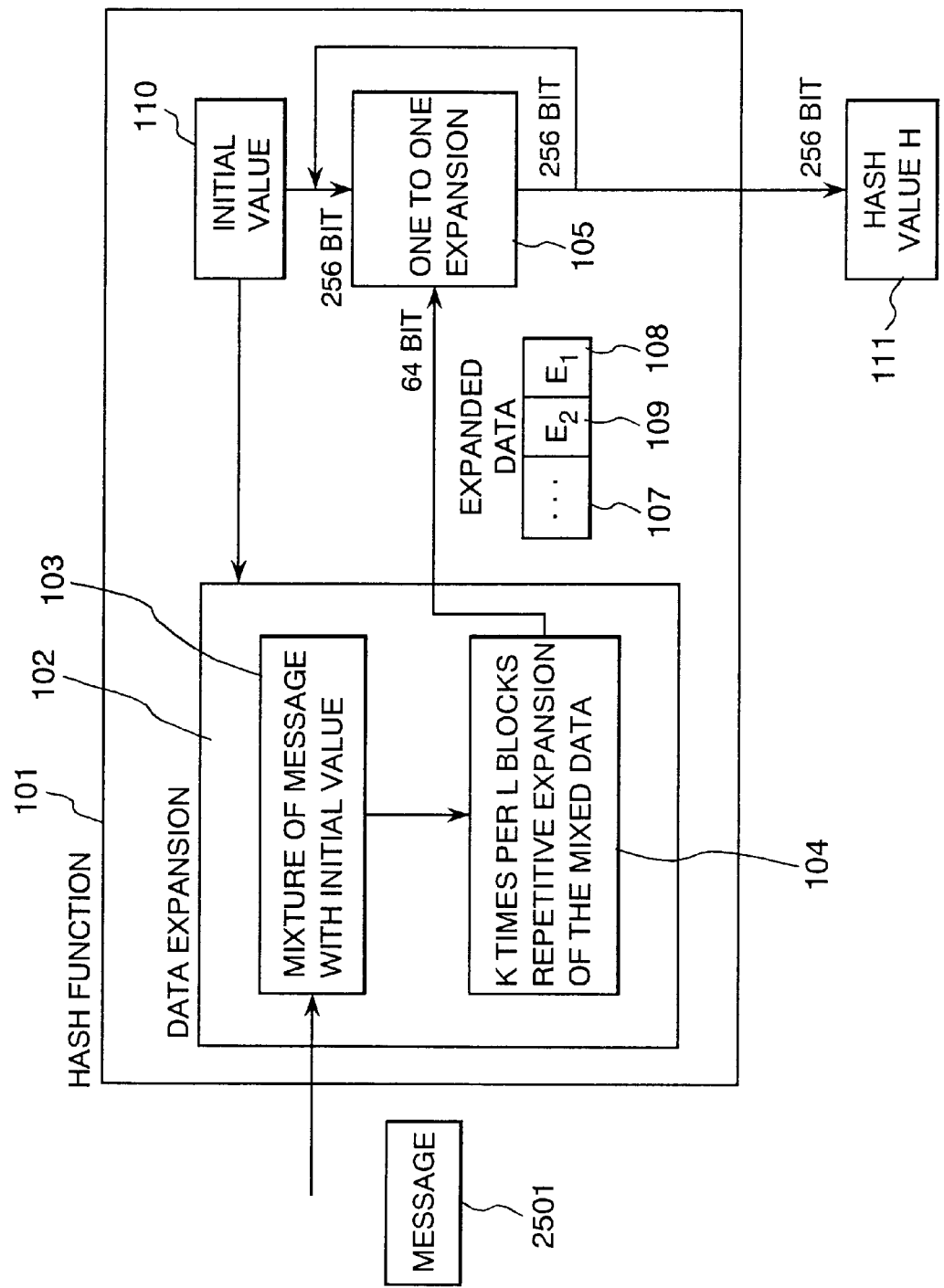
FIG. 1 is a diagram illustrating a construction example of a 256-bit hash function according to an embodiment of the invention.

FIG. 1 is a diagram showing an embodiment of the invention. When a message 2501 is inputted to a hash function 101, a process 103 of "mixture of the message with an initial value" is performed in a data expansion part 102. After that, a process 104 of "K times per L blocks repetitive expansion of the mixed data" is performed and expanded data 107 is generated. Subsequently, the expanded data 107 is divided into parts each having the length of 64 bits such as a first division $E_1$ 108 of 64 bits, a second division $E_2$ 109 of 64 bits, . . . , and the resultant data is inputted to a one to one expansion part 105. In the one to one expansion part 105, by performing the one to one expansion to the 64-bit first division $E_1$ 108 by using an initial value 110 of 256 bits as a parameter, an intermediate output of 256 bits is obtained. By performing the one to one expansion 105 to the 64-bit second division $E_2$ 109 by using the intermediate output as a parameter, an intermediate output of 256 bits is obtained. Such processes are repeated and an intermediate output of 256 bits which is obtained at last serves as a hash value H 111 to be derived.

Figure 2:
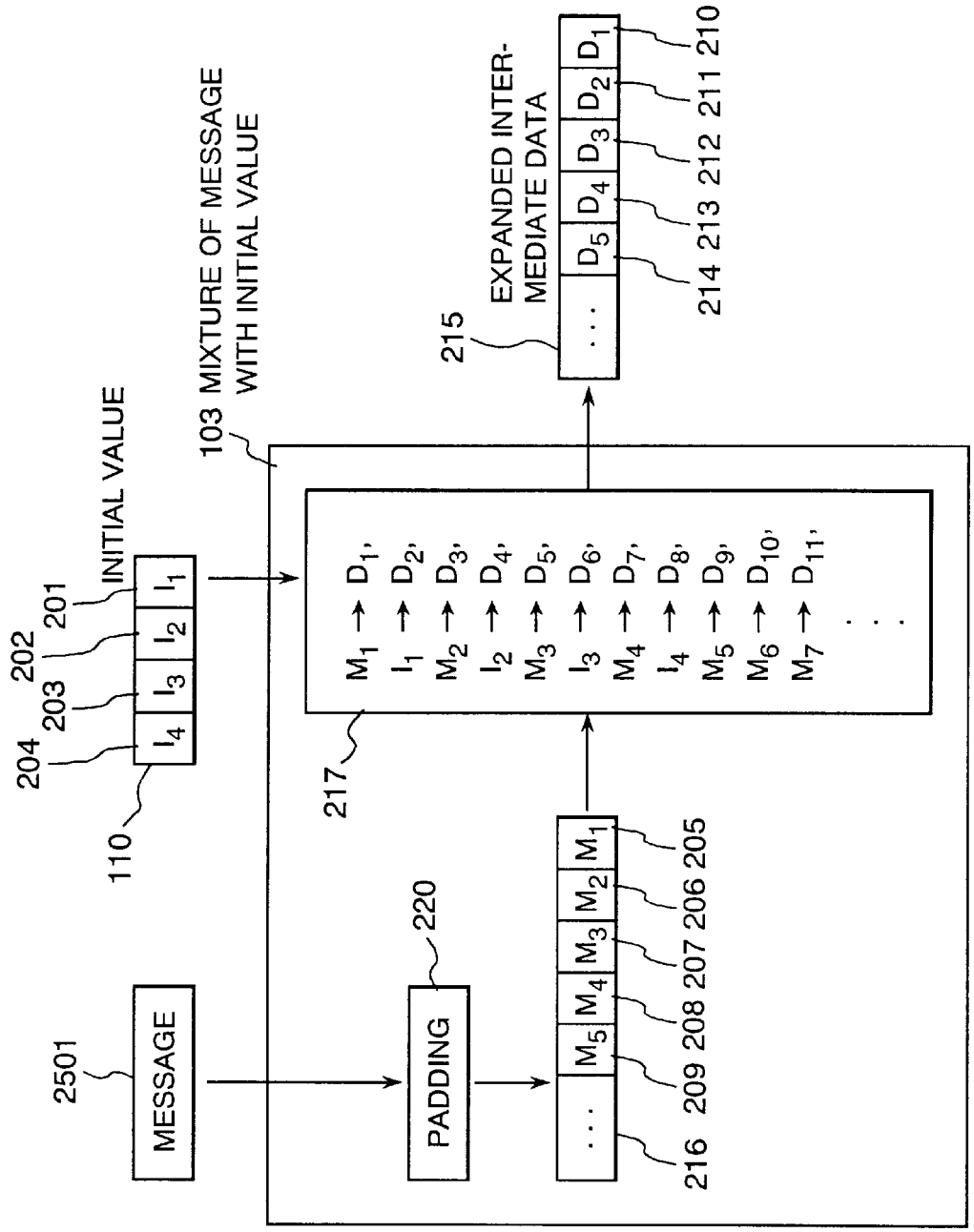
FIG. 2 is a diagram illustrating a construction example of a mixing process of a message with an initial value in the 256-bit hash function of FIG. 1.

FIG. 2 shows the details of the process 103 of "the mixture of the message with the initial value" in FIG. 1. The initial value 110 and the message 2501 are inputted to the process 103 of "the mixture of the message with the initial value". The initial value 110 consists of four 64-bit data blocks $I_1$ 201, $I_2$ 202, $I_3$ 203, and $I_4$ 204 in this order. First, in a padding process 220, with reference to a preset integer L, data is connected to the message 2501 so that the numerical value obtained by adding 256 to the length of the message 2501 is equal to a value which is integer times as large as (L×64).

(1) When the numerical value obtained by adding 256 to the length of the message 2501 is equal to a value which is integer times as large as (L×64), the bit "1" and (L×64−1) pieces of the bit "0" are connected to the end of the message in this order.

(2) When the numerical value obtained by adding 256 to the length of the message 2501 is not equal to a value which is integer times as large as (L×64) bits, the bit "1" and a few pieces (from 0 to (L×64−2)) of the bit "0" are connected to the end of the message in this order, thereby adjusting the total length to the value which is integer times as large as (L×64) bits.

The message 2501 becomes data 216 in which (N) 64-bit data blocks $M_1$ 205, $M_2$ 206, $M_3$ 207, $M_4$ 208, $M_5$ 209, . . . are sequentially lined in a row after the padding process. When the data 216 is inputted to a process 217, the data is substituted like $M_1$ to $D_1$, $I_1$ to $D_2$, $M_2$ to $D_3$, $I_2$ to $D_4$, $M_3$ to $D_5$, $I_3$ to $D_6$, $M_4$ to $D_7$, $I_4$ to $D_8$, $M_5$ to $D_9$, $M_6$ to $D_{10}$, $M_7$ to $D_{11}$, . . . . Data in which (N+4) 64-bit data blocks $D_1$ 210, $D_2$ 211, $D_3$ 212, $D_4$ 213, $D_5$ 214, . . . are sequentially lined in a row is generated as expanded intermediate data 215. The length of the expanded intermediate data 215 is just the integer times of (L×64 bits).

Figure 3:
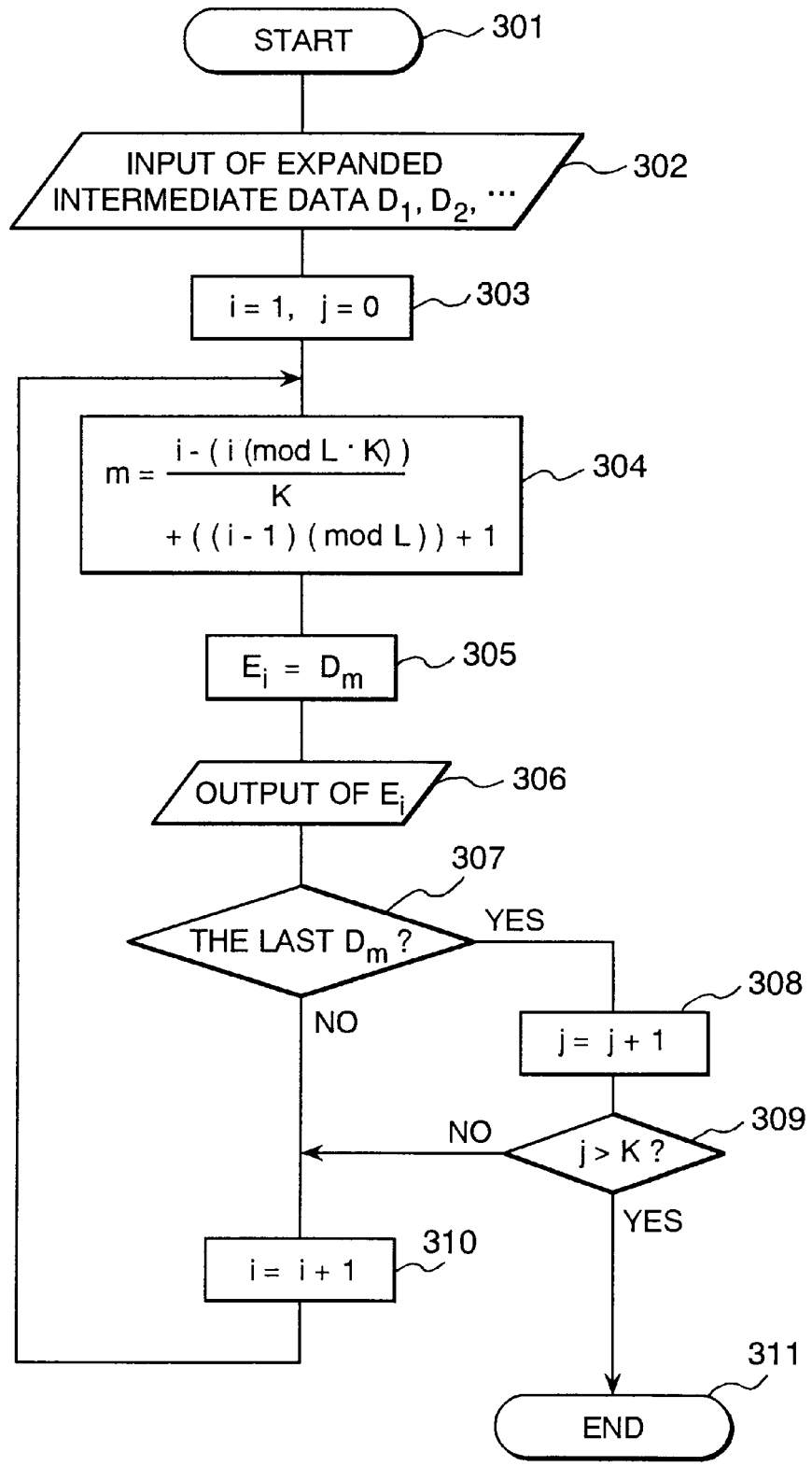
FIG. 3 is a flowchart showing the flow of K times per L blocks repetitive expansion of mixed data in the 256-bit hash function of FIG. 1.

FIG. 3 shows a detailed flow of the process 104 of "the K times per L blocks repetitive expansion of the mixed data" in FIG. 1. In FIG. 3, the following processes are performed.

Step 301: start

Step 302: The expanded intermediate data $D_1$, $D_2$, . . . obtained in the process of FIG. 2 is inputted.

Step 303: i=1, j=0 are set.

Step 304: m=(I−(i(mod L·K)))/K+((I−1)(mod L)) +1

Step 305: $E_i = D_m$

Step 306: $E_i$ is outputted.

Step 307: Is $D_m$ the last input data? If YES, the processing routine advances to step 308. If NO, the processing routine advances to step 310.

Step 308: j=j+1

Step 309: j>K? If YES, the processing routine advances to step 311. If NO, the processing routine advances to step 310.

Step 310: i=i+1. The processing routine is returned to step 304.

Step 311: End

By executing the process of FIG. 3, the expanded intermediate data $D_1$, $D_2$, . . . is expanded in such a manner that it is repeated K times every L blocks and is outputted as expanded data $E_1$, $E_2$, . . . . The length of each of the expanded data $E_1$, $E_2$, . . . is K times as long as that of each of the expanded intermediate data $D_1$, $D_2$, . . . .

Figure 4:
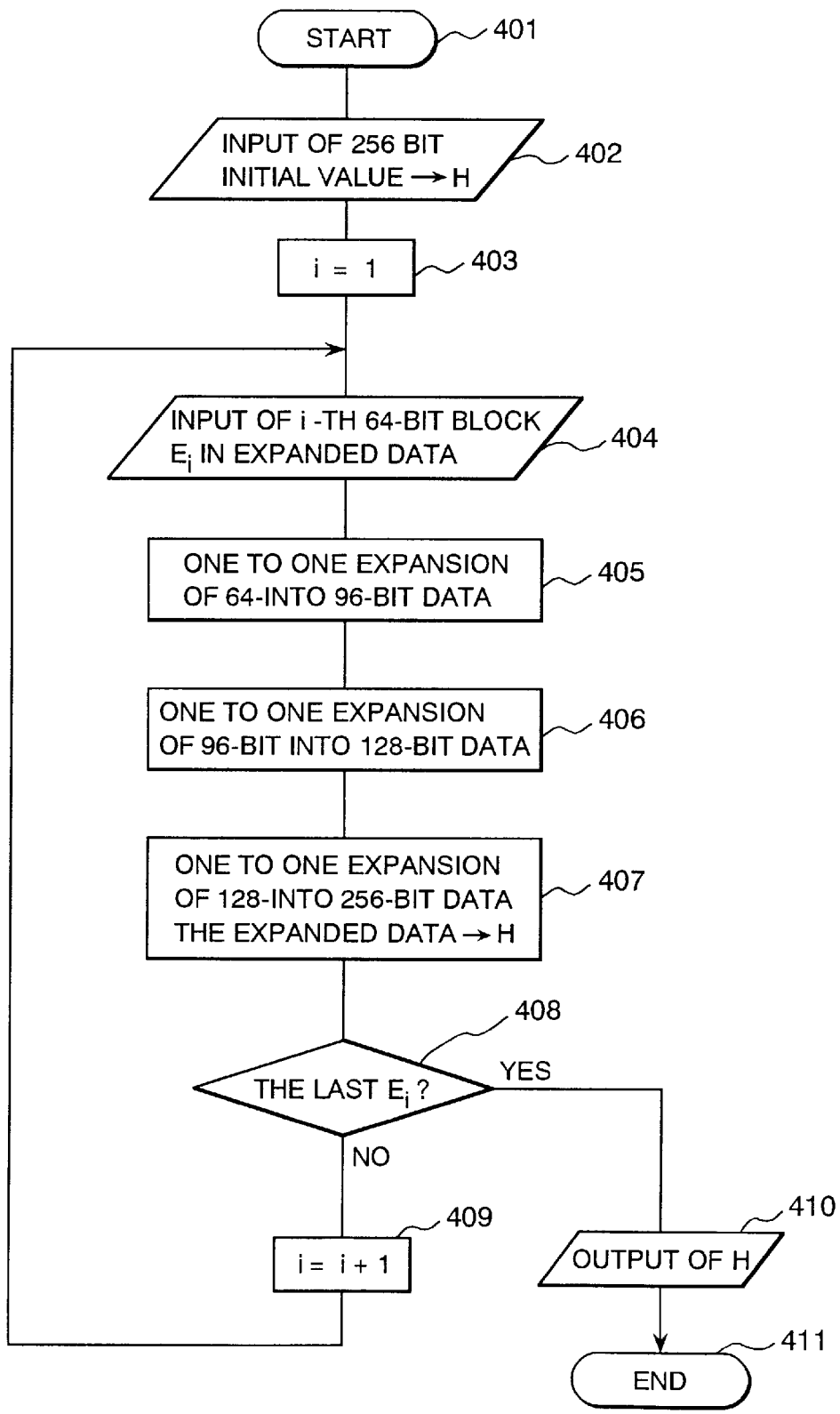
FIG. 4 is a flowchart showing the processing flow of a one to one expansion part in FIG. 1.

FIG. 4 shows a detailed flow of the one to one expansion part 105 in FIG. 1. In FIG. 4, the following process is executed.

Step 401: Start

Step 402: An initial value of 256 bits is inputted as H.

Step 403: i=1 is set

Step 404: The (i)th 64-bit block $E_i$ in the expanded data as an output of FIG. 3 is inputted.

Step 405: One to one expansion from 64-bit data into 96-bit data is performed to $E_i$, thereby obtaining data of 96 bits.

Step 406: One to one expansion from 96-bit data into 128-bit data is performed to the derived 96-bit data, thereby obtaining data of 128 bits.

Step 407: One to one expansion from 128-bit data to 256-bit data is performed to the derived 128-bit data, thereby obtaining 256-bit data H.

Step 408: Is $E_i$ the last input data? If YES, the processing routine advances to step 410. If NO, the processing routine advances to step 409.

Step 409: i=i+1 is set. The processing routine is returned to step 404.

Step 410: The 256-bit data H is outputted.

Step 411: End

The output value H obtained as a result of the process of FIG. 4 is the hash value H 111.

Figure 5:
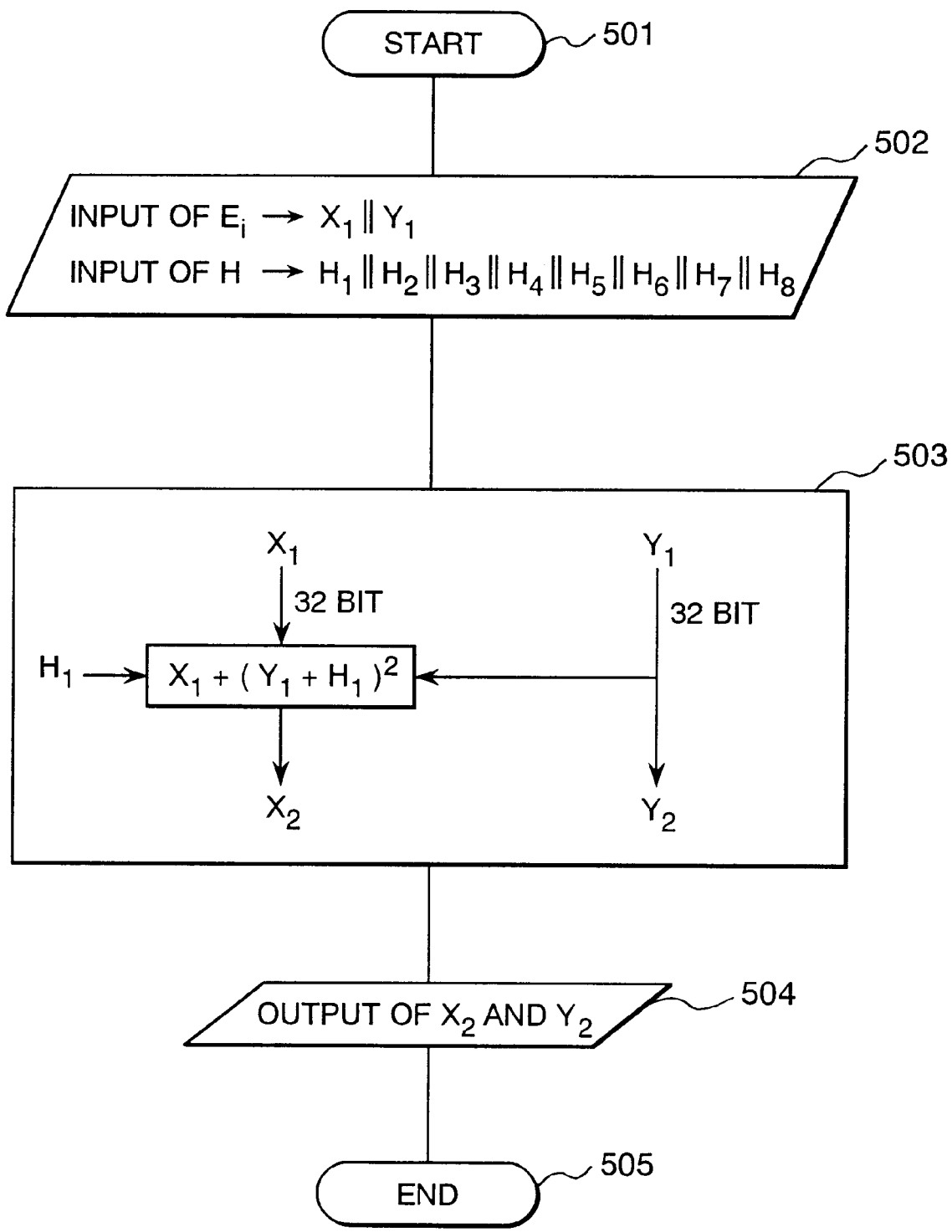
FIG. 5 is a flowchart showing the processing flow of one to one expansion from 64-bit data to 96-bit data in the processing flow of the one to one expansion part of FIG. 4.

FIG. 5 shows a detailed flow of the step 405 of "the one to one expansion from 64-bit data into 96-bit data". In FIG. 5, the following process is executed.

Step 501: Start Step 502: The 64-bit data block $E_i$ is inputted. The upper 32 bits of $E_i$ are set as $X_1$ and the lower 32 bits of $E_i$ are set as $Y_1$. Similarly, the 256-bit data block H is inputted and is divided from the head every 32 bits, thereby obtaining eight 32-bit data $H_1$, $H_2$, . . . , $H_8$.

Step 503: $X_2 = X_1 + (Y_1 + H_1)^2$ and $Y_2 = Y_1$ are calculated. Consequently, data of 64 bits is derived as $X_2$ and data of 32 bits is obtained as $Y_2$.

Step 504: $X_2$ and $Y_2$ are outputted.

Step 505: End

By the process of FIG. 5, the 64-bit input data $E_i$ is expanded to data of total 96 bits of the 64-bit $X_2$ and the 32-bit $Y_2$ and the data of 96 bits is outputted. In the process of step 503, $(X_1, Y_1 \text{ to } X_2, Y_2)$ is one to one expansion since an output space (96 bits) is longer than an input space (64 bits) and when $X_2$ and $Y_2$ are given, $X_1$ and $Y_1$ are unconditionally determined by $X_1=X_2-(Y_2+H_1)^2$, $Y_1=Y_2$.

Figure 6:
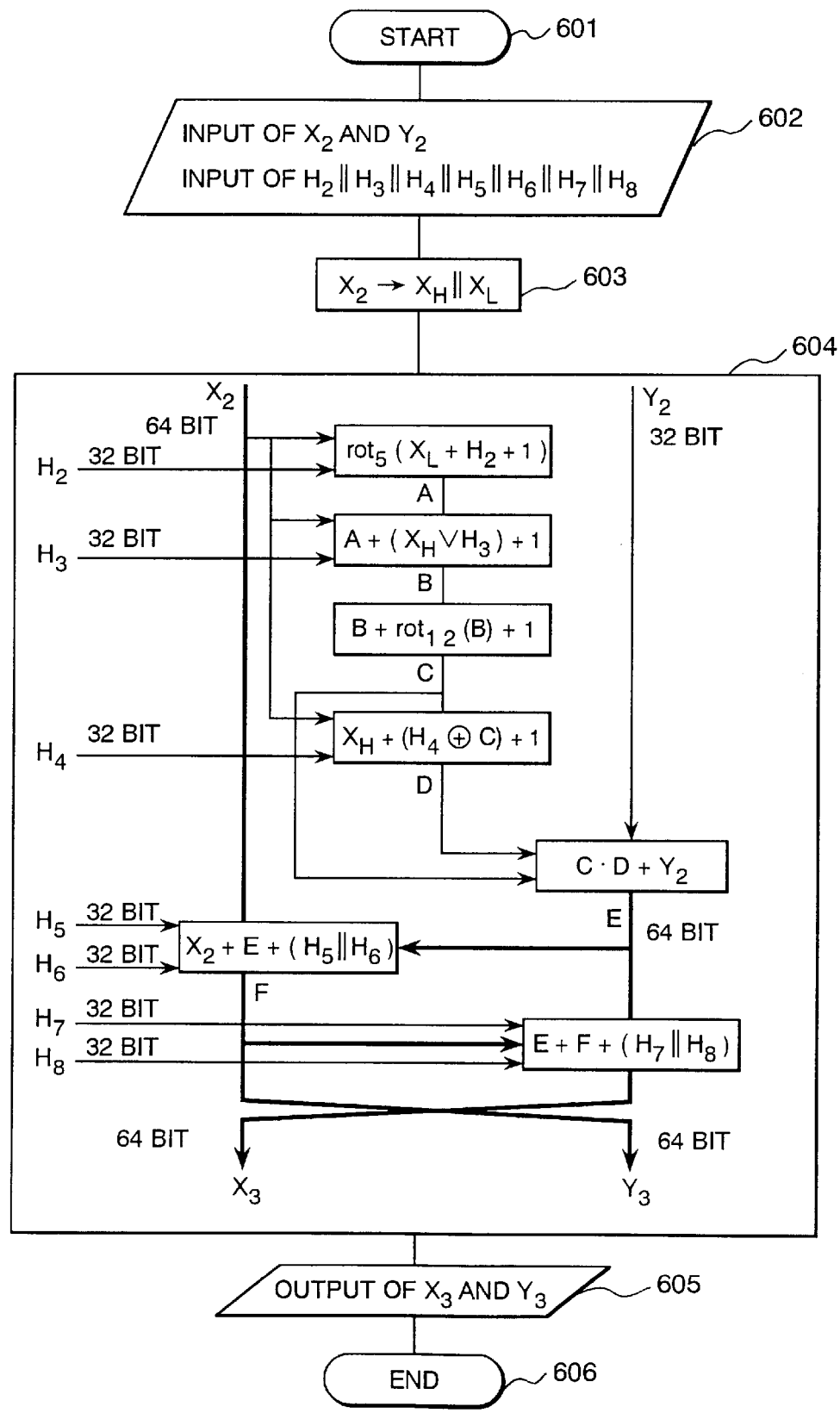
FIG. 6 is a flowchart showing the processing flow of one to one expansion from 96-bit data to 128-bit data in the processing flow of the one to one expansion part of FIG. 4.

FIG. 6 shows a detailed flow of the step 406 of "the one to one expansion from 96-bit data to 128-bit data" in FIG. 4.

Step 601: Start Step 602: $X_2$ and $Y_2$ obtained in FIG. 5 are inputted. $H_1$, $H_2$, $H_3$, $H_4$, $H_5$, $H_6$, $H_7$, and $H_8$ are also inputted.

Step 603: The upper 32 bits of $X_2$ are set as $X_H$ and the lower 32 bits are set as $X_L$.

Step 604: The following calculation is sequentially executed.

$A=\text{rot}_5(X_L+H_2+1)$ $B=A+(X_H \text{V} H_3)+1$ $C=B+\text{rot}_{12}(B)+1$ $D=X_H+(H_4 \text{ XOR } C)+1$ $E=C \cdot D+Y_2$ $F=X_2+E+(H_5 \| H_6)$ $X_3=E+F+(H_7 \| H_8)$ $Y_3=F$ $\text{rot}_T(U)$ shows data obtained by cyclically shifting numerical data U by T bits to the high order side. For example, $\text{rot}_2(110000)$ is 000011 (the left side of the numerical data is the high order side). XOR shows the exclusive OR of every bit (it is shown by a sign having "+" in a circle in the diagram). For example, 110010 XOR 011001=101011. + denotes addition of digits. When shift occurs in calculation of the most significant bit, the shift part is ignored. For instance, 101101+100100=010001.

$\|$ shows the connection of data. For example, 101101$\|$100100=101101100100.

Step 605: $X_3$ and $Y_3$ are outputted.

Step 606: End

By the process of FIG. 6, the 64-bit input data $X_2$ and the 32-bit input data $Y_2$ is expanded to data of total 128 bits of the 64-bit data $X_3$ and the 64-bit data $Y_3$ and the resultant data is outputted. The process of step 604 is the one to one expansion in a manner similar to step 503.

Figure 7:
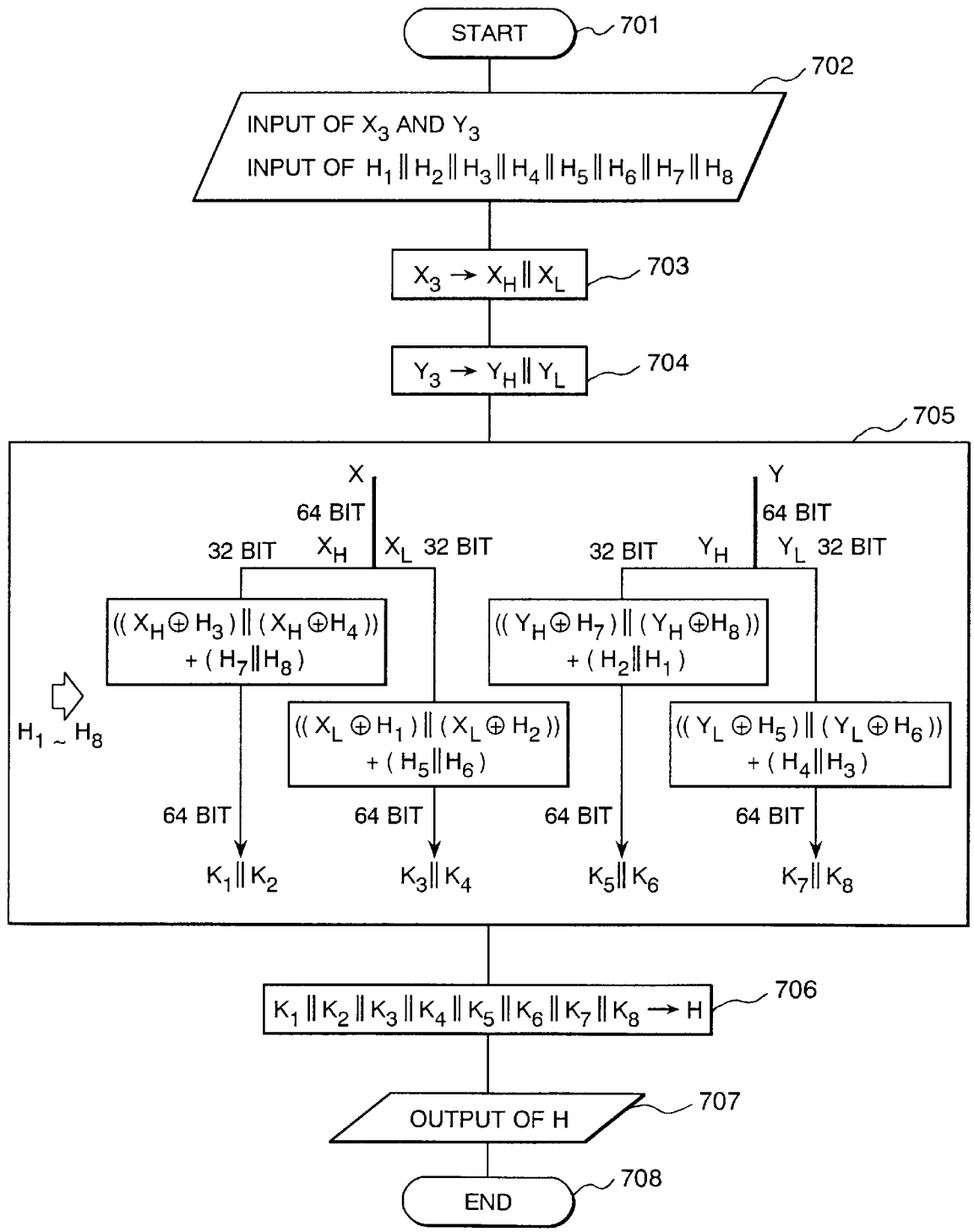
FIG. 7 is a flowchart showing the processing flow of one to one expansion from 128-bit data to 256-bit data in the processing flow of the one to one expansion part of FIG. 4.

FIG. 7 shows a detailed flow of "the one to one expansion from 128-bit data to 256-bit data" 407 in FIG. 4.

Step 701: Start Step 702: $X_3$ and $Y_3$ obtained in FIG. 6 are inputted. $H_1$, $H_2$, $H_3$, $H_4$, $H_5$, $H_6$, $H_7$, and $H_8$ obtained in FIG. 5 are also inputted.

Step 703: The upper 32 bits of $X_3$ are set as $X_H$ and the lower 32 bits of $X_3$ are set as $X_L$.

Step 704: The upper 32 bits of $Y_3$ are set as $Y_H$ and the lower 32 bits are set as $Y_L$.

Step 705: The following process is executed.

$K1\|K2=((X_H \text{ XOR } H_3)\|(X_H \text{ XOR } H_4))+(H_7\|H_8)$ $K3\|K4=((X_L \text{ XOR } H_1)\|(X_L \text{ XOR } H_2))+(H_5\|H_6)$ $K5\|K6=((Y_H \text{ XOR } H_7)\|(Y_H \text{ XOR } H_8))+(H_2\|H_1)$ $K7\|K8=((Y_L \text{ XOR } H_5)\|(Y_L \text{ XOR } H_6))+(H_4\|H_3)$ Step 706: $K_1\|K_2\|K_3\|K_4\|K_5\|K_6\|K_7\|K_8 \rightarrow H$ Step 707: H is outputted.

Step 708: End

By the process of FIG. 7, the input data $X_3$ of 64 bits and the input data $Y_3$ of 64 bits are expanded to H of 256 bits and H is outputted. In step 705, the one to one expansion similar to that of step 505 is executed.

Figure 8:
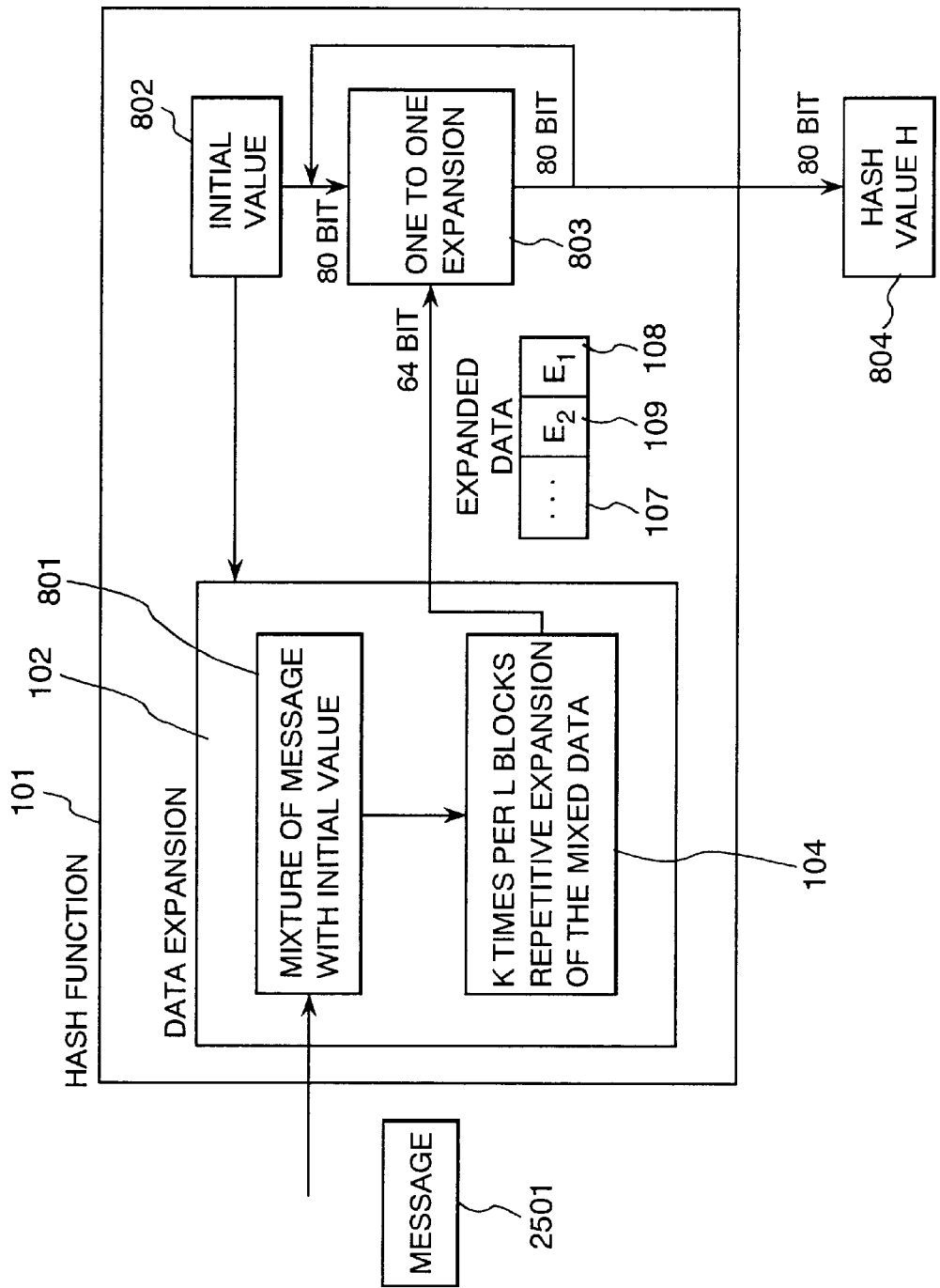
FIG. 8 is a diagram illustrating a construction example of an 80-bit hash function according to another embodiment of the invention.

FIG. 8 is a diagram showing another embodiment of the invention. An initial value 802, a hash value H 804, a process 801 of "mixture of a message with the initial value", and a one to one expansion part 803 are different from FIG. 1.

(1) In FIG. 1, the length of the initial value 110 is 256 bits. In FIG. 8, the length of the initial value 802 is 80 bits.

(2) In FIG. 1, the length of the hash value H 111 is 256 bits. In FIG. 8, the length of the hash value H 804 is 80 bits.

Figure 9:
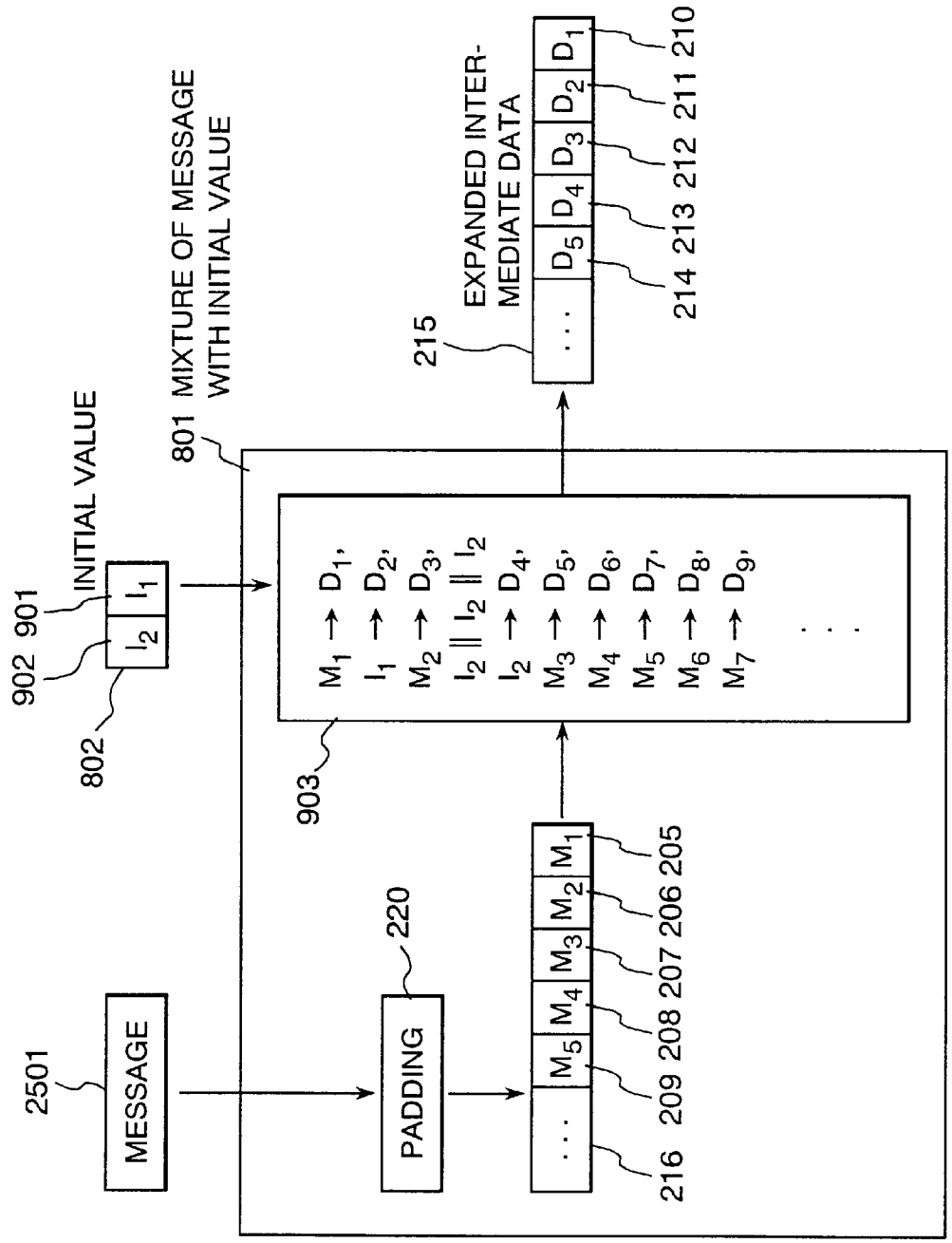
FIG. 9 is a diagram illustrating a construction example of a mixing process of a message with an initial value in the 80-bit hash function of FIG. 8.

(3) In FIG. 1, the details of the process 103 of "the mixture of the message with the initial value" are as shown in FIG. 2. The process 801 of "the mixture of the message with the initial value" is as shown in FIG. 9.

To the process 801 of "the mixture of the message with the initial value", the initial value 802 and the message 2501 are inputted. In the initial value 802, a 64-bit data block $I_1$ 901 and a 16-bit data block $I_2$ 902 are lined in a row in this order. The message 2501 is transformed to data in which (N) 64-bit data blocks $M_1$ 205, $M_2$ 206, $M_3$ 207, $M_4$ 208, $M_5$ 209, . . . are sequentially lined by the padding process 220. When the data is inputted to a process 903, the data is substituted like $M_1$ to $D_1$, $I_1$ to $D_2$, $M_2$ to $D_3$, $I_2\|I_2\|I_2\|I_2$ to $D_4$, $M_3$ to $D_5$, $M_4$ to $D_6$, $M_5$ to $D_7$, $M_6$ to $D_8$, $M_7$ to $D_9$, . . . . As a result of the substitution, data in which (N+2) 64-bit data blocks $D_1$ 211, $D_2$ 211, $D_3$ 212, $D_4$ 213, $D_5$ 214, . . . are sequentially lined is outputted as the expanded intermediate data 215.

Figure 10:
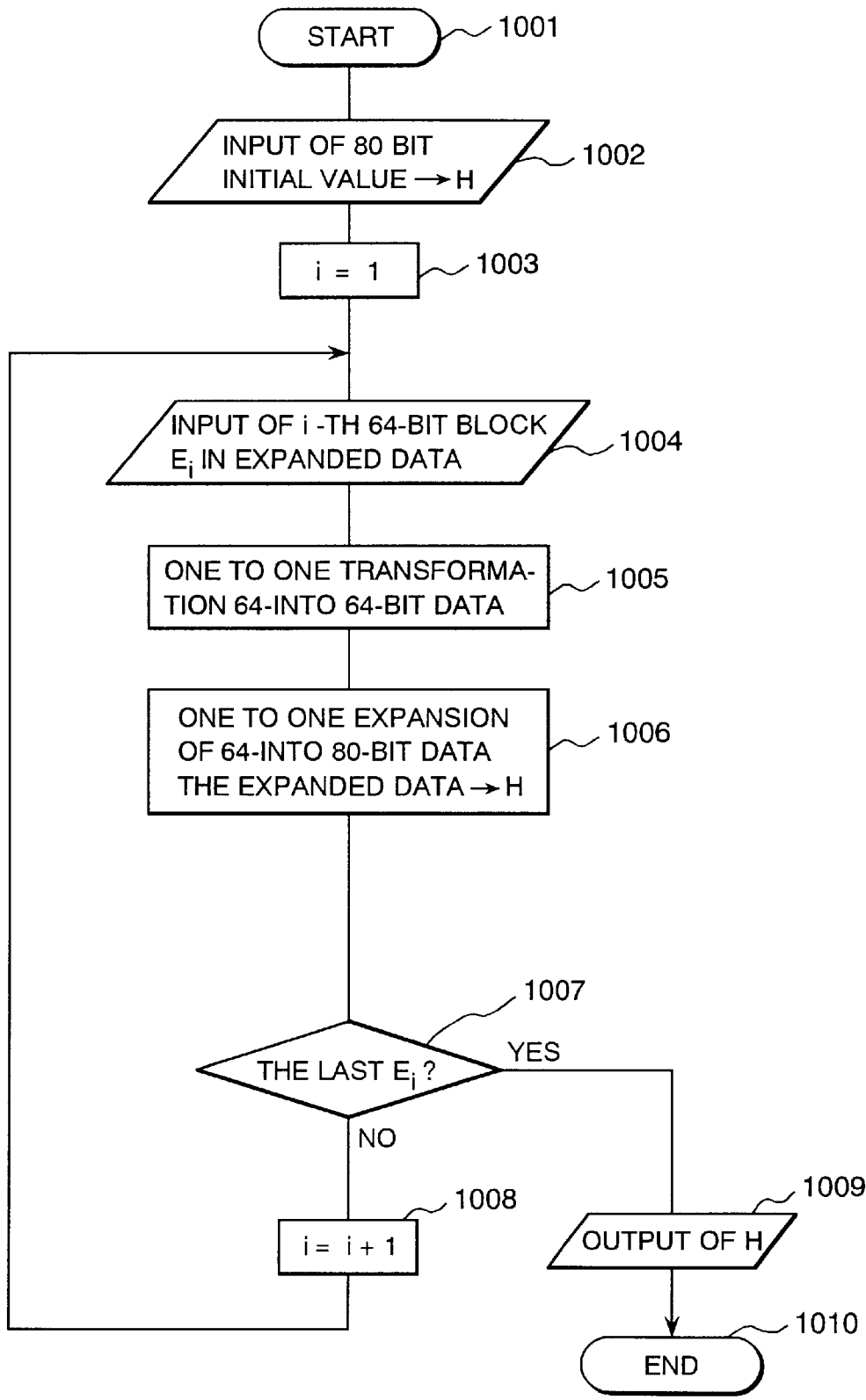
FIG. 10 is a flowchart showing the processing flow of a one to one expansion part in FIG. 8.

(4) In FIG. 1, the process of the one to one expansion part 105 is as shown in FIG. 4. The process of the one to one expansion part 803 in FIG. 8 is as shown in FIG. 10.

Step 1001: Start

Step 1002: The initial value of 80 bits is inputted as H.

Step 1003: i=1 is set.

Step 1004: In the expanded data as the output of FIG. 3, the (i)th 64-bit block $E_i$ is inputted.

Step 1005: The one to one transformation from 64-bit data to 64-bit data is performed to $E_i$, thereby obtaining 64-bit data.

Step 1006: The one to one expansion from 64-bit data to 80-bit data is performed to the obtained 64-bit data, thereby deriving 80-bit data. The derived 80-bit data is set as H.

Step 1007: Is $E_i$ the last input data? If YES, the processing routine advances to step 1009. If NO, the processing routine advances to step 1008.

Step 1008: i=i+1 is set. The processing routine is returned to step 1004.

Step 1009: The data H of 80 bits is outputted.

Step 1010: End

The output value H obtained by the process of FIG. 10 is the hash value H 804.

Figure 11:
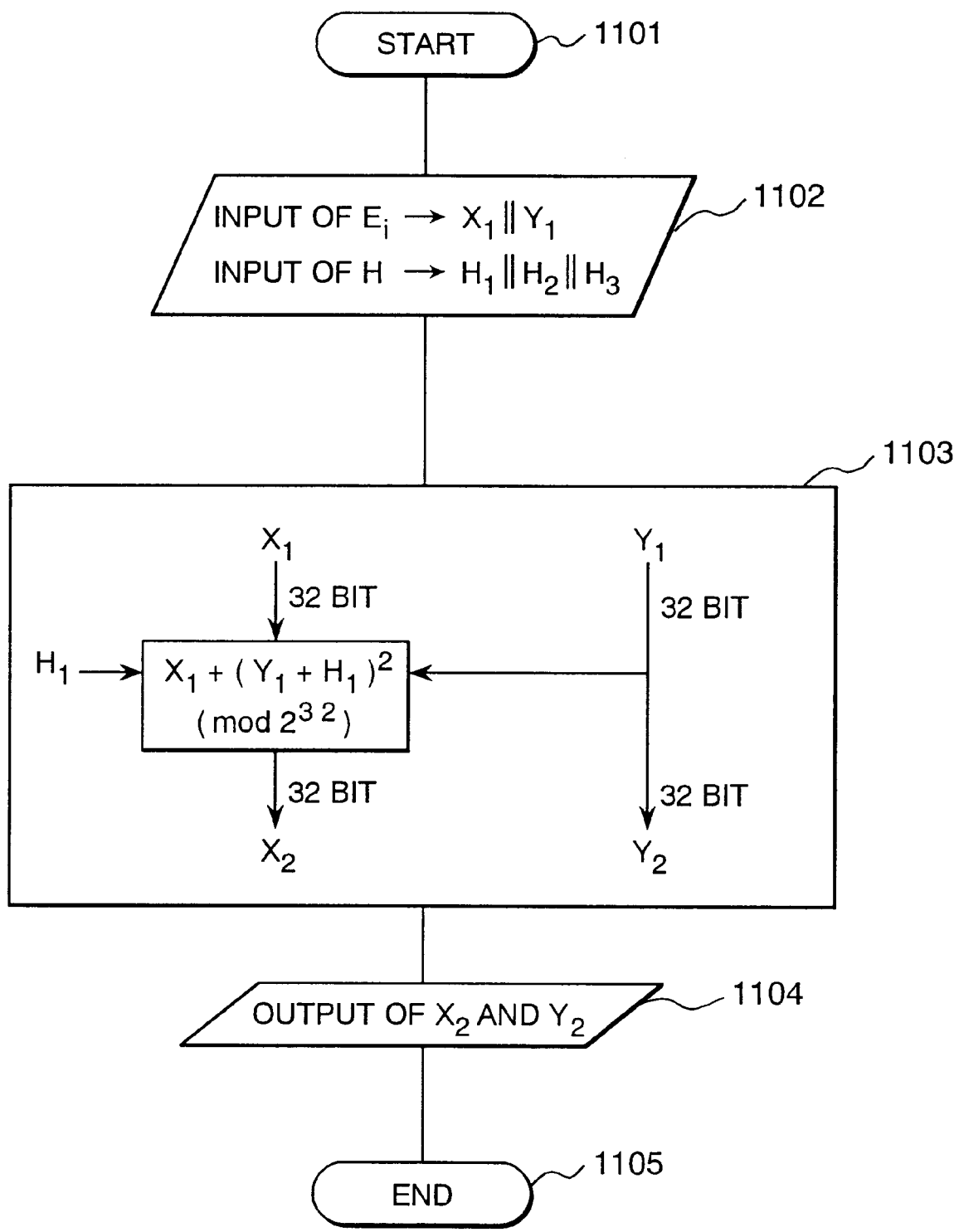
FIG. 11 is a flowchart showing the processing flow of one to one transformation from 64-bit data to 64-bit data in the processing flow of the one to one expansion part of FIG. 10.

FIG. 11 shows a detailed flow of the "one to one expansion from 64-bit data to 80-bit data" in FIG. 10. The following process is performed in FIG. 11.

Step 1101: Start Step 1102: The 64-bit data block $E_i$ is inputted. The upper 32 bits of $E_i$ are set as $X_1$ and the lower 32 bits are set as $Y_1$. Similarly, the 80-bit data block H is inputted and is divided from the head into three parts of 32 bits, 32 bits, and 16 bits, thereby obtaining three data $H_1$, $H_2$, and $H_3$.

Step 1103: $X_2=X_1+(Y_1+H_1)^2$ (mod $2^{32}$) and $Y_2=Y_1$ are calculated. X (mod $2^{32}$) shows the remainder when X is divided by $2^{32}$. As a result, $X_2$ becomes data of 32 bits and $Y_2$ becomes data of 32 bits.

Step 1104: $X_2$ and $Y_2$ are outputted.

Step 1105: End

By the process of FIG. 11, the input data $E_i$ of 64 bits is transformed to data of total 64 bits of $X_2$ of 32 bits and $Y_2$ of 32 bits and the resultant data is outputted. In the process of step 1103, $X_1$, $Y_1$ correspond to $X_2$, $X_2$ in a one to one manner, for when $X_2$, $Y_2$ are given, $X_1$ and $Y_1$ are unconditionally determined by $X_1 = X_2 - (Y_2 + H_1)^2 \pmod{2^{48}}$ and $Y_1 = Y_2$.

Figure 12:
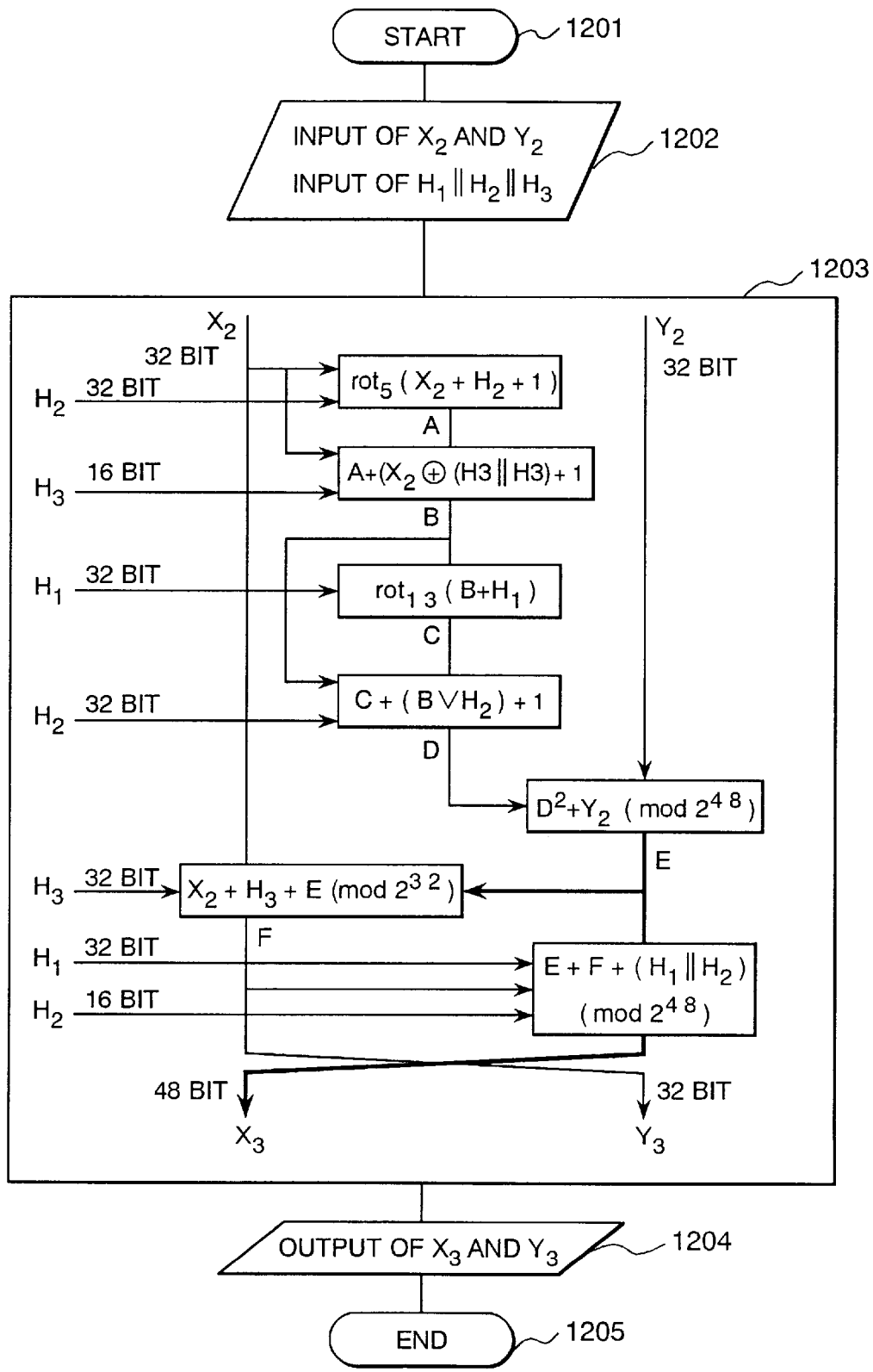
FIG. 12 is a flowchart showing the processing flow of one to one expansion process from 64-bit data to 80-bit data in the processing flow of the one to one expansion part of FIG. 10.

FIG. 12 shows a detailed flow of the "one to one expansion from 64-bit data to 80-bit data" 1006 in FIG. 10.

Step 1201: Start

Step 1202: $X_2$ and $Y_2$ derived in FIG. 11 are inputted. $H_1$, $H_2$, and $H_3$ are also inputted.

Step 1203: The following calculation is sequentially executed.

$A = \mathrm{rot}_5(X_2 + H_2 + 1)$ $B = A + (X_2 \; \mathrm{XOR} \; (H_3 \| H_3)) + 1$ $C = \mathrm{rot}_{13}(B + H_1)$ $D = C + (B \vee H_2) + 1$ $E = D_2 + Y_2 \pmod{2^{48}}$ $F = X_2 + H_3 + E \pmod{2^{32}}$ $X_3 = E + F(H_{1\|H2}) \pmod{2^{48}}$ $Y_3 = F$ Step 1204: $X_3$ and $Y_3$ are outputted.

Step 1205: End

By the process of FIG. 12, the input data $X_2$ of 32 bits and the input data $Y_2$ of 32 bits are expanded to data of total 80 bits of $X_3$ of 32 bits and $Y_3$ of 48 bits and the resultant data is outputted. The process of step 1203 is one to one expansion.

As mentioned above, according to the another embodiment, the hash function for generating the output of 80 bits by using the one to one expansion can be constructed.

Similarly, the hash function for generating an output having an arbitrary length of 64 bits or larger can be constructed by using the one to one expansion.

Figure 13:
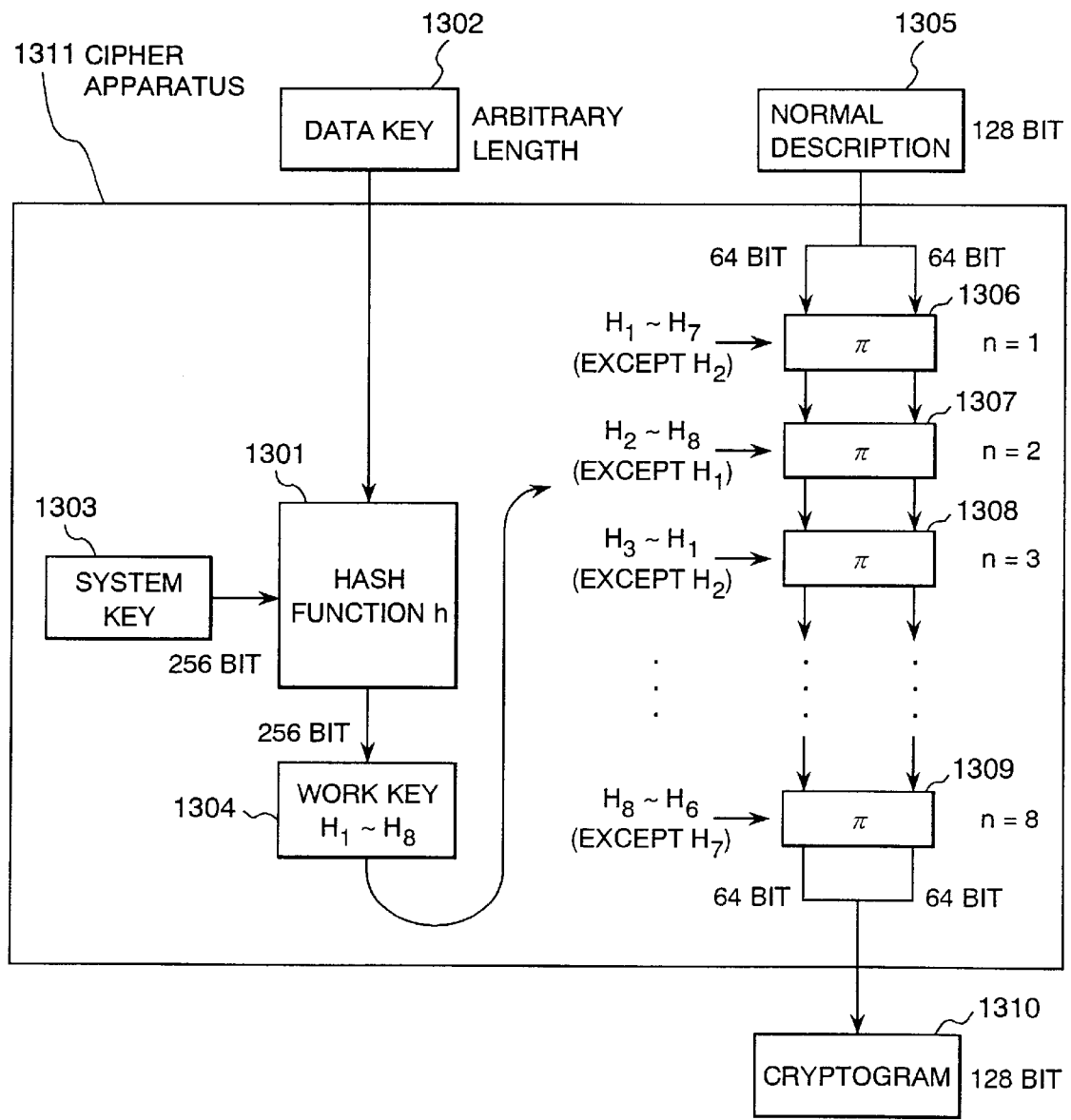
FIG. 13 is a diagram illustrating a construction example of a 128-bit block cipher according to further another embodiment of the invention.

FIG. 13 is a diagram showing further another embodiment of the invention. In FIG. 13, a data key 1302 having an arbitrary length and a normal description 1305 of 128 bits are inputted to a cipher apparatus 1311 and a cryptogram 1310 of 128 bits is outputted. A hash function h 1301 is the same as that shown in FIG. 1. The data key having the arbitrary length is inputted and a hash value of 256 bits is generated as a work key 1304. A system key 1303 is given as an initial value of the hash function h 1301. The work key of 256 bits is divided into eight 32-bit data $H_1$, $H_2$, ..., and $H_8$. The normal description 1305 of 128 bits is transformed by a function $\pi$ 1306 by using seven 32-bit data $H_1$ to $H_7$ in the work key 1304 (except for $H_8$). Further, the result of the transformation is transformed by a function $\pi$ 1307 by using the seven 32-bit data $H_2$ to $H_8$ in the work key 1304 (except for $H_1$). Such processes are repeated and, finally, data is transformed by a function $\pi$ 1309 by using the seven 32-bit data $H_8$ to $H_6$ in the work key 1304 (except for $H_7$). Consequently, the cryptogram of 128 bits is outputted.

Figure 14:
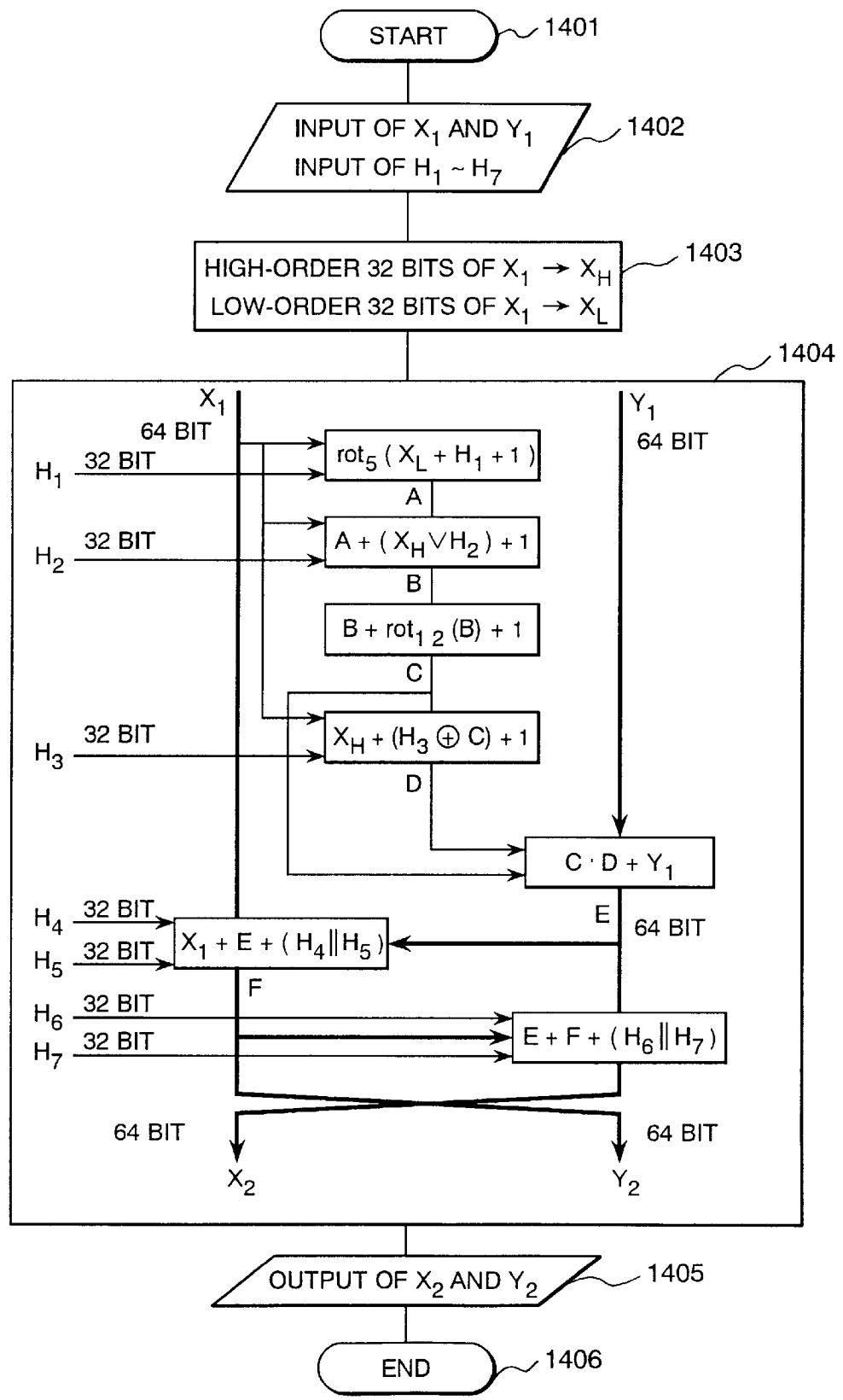
FIG. 14 is a flowchart showing the detailed flow of a π function in the block cipher of FIG. 13.

FIG. 14 shows a processing flow of the function $\pi$ 1306 in FIG. 13.

Step 1401: Start Step 1402: The two 64-bit data $X_1$ and $Y_1$ are inputted. The seven 32-bit data $H_1$ to $H_7$ are also inputted.

Step 1403: The high-order 32 bits of $X_1$ are set as $X_H$ and the low-order 32 bits of $X_1$ are set as $X_L$.

Step 1404: The following calculation is sequentially executed.

$A = \mathrm{rot}_5(X_L + H_1 + 1)$ $B = A + (X_H \vee H_2) + 1$ $C = B + \mathrm{rot}_{12}(B) + 1$ $D = X_H + (H_1 \; \mathrm{XOR} \; C) + 1$ $E = C \cdot D + Y_1$ $F = X_1 + E + (H_4 \| H_5)$ $X_2 = E + F + (H_6 \| H_7)$ $Y_2 = F$ Step 1405: $X_2$ and $Y_2$ are outputted.

Step 1406: End

By the process of FIG. 14, the input data $X_1$ of 64 bits and the input data $Y_1$ of 64 bits are transformed to data of total 128 bits of $X_2$ of 64 bits and $Y_2$ of 64 bits and the resultant data is outputted. The process of the function $\pi$ ($X_1 \| Y_1$ to $Y_2 \| Y_2$) is executed in a full one to one manner. That is, inverse transformation $\pi^{-1}$ from the output $X_2 \| Y_2$ to the input $X_1 \| Y_1$ exists:

(1) $X_2 \| Y_2$ is inputted to $\pi^{-1}$.

(2) The following calculation is sequentially executed.

$F = Y_2$ $E = X_2 - F - (H_6 \| H_7)$ $X_1 = F - E - (H_4 \| H_5)$ $X_H \| X_L = X_1$ $A = \mathrm{rot}_5(X_L + H_1 + 1)$ $B = A + (X_H \vee H_2) + 1$ $C = B + \mathrm{rot}_{12}(B) + 1$ $D = X_H + (H_3 \; \mathrm{XOR} \; C) + 1$ $Y_1 = E - C \cdot D$ (3) $X_1 \| Y_1$ is outputted from $\pi^{-1}$.

Similar processes are executed with respect to the other functions $\pi$ 1307 to 1309. Consequently, the cryptogram 1310 generated in FIG. 13 can be decoded to the original normal description by the inverse transformation using $\pi^{-1}$.

Although the number (n) of repeating the function (f) is eight in the embodiment of FIG. 13, (n) can be also changed to an arbitrary positive integer by, generally, giving the value of (n) from the outside.

Figure 15:
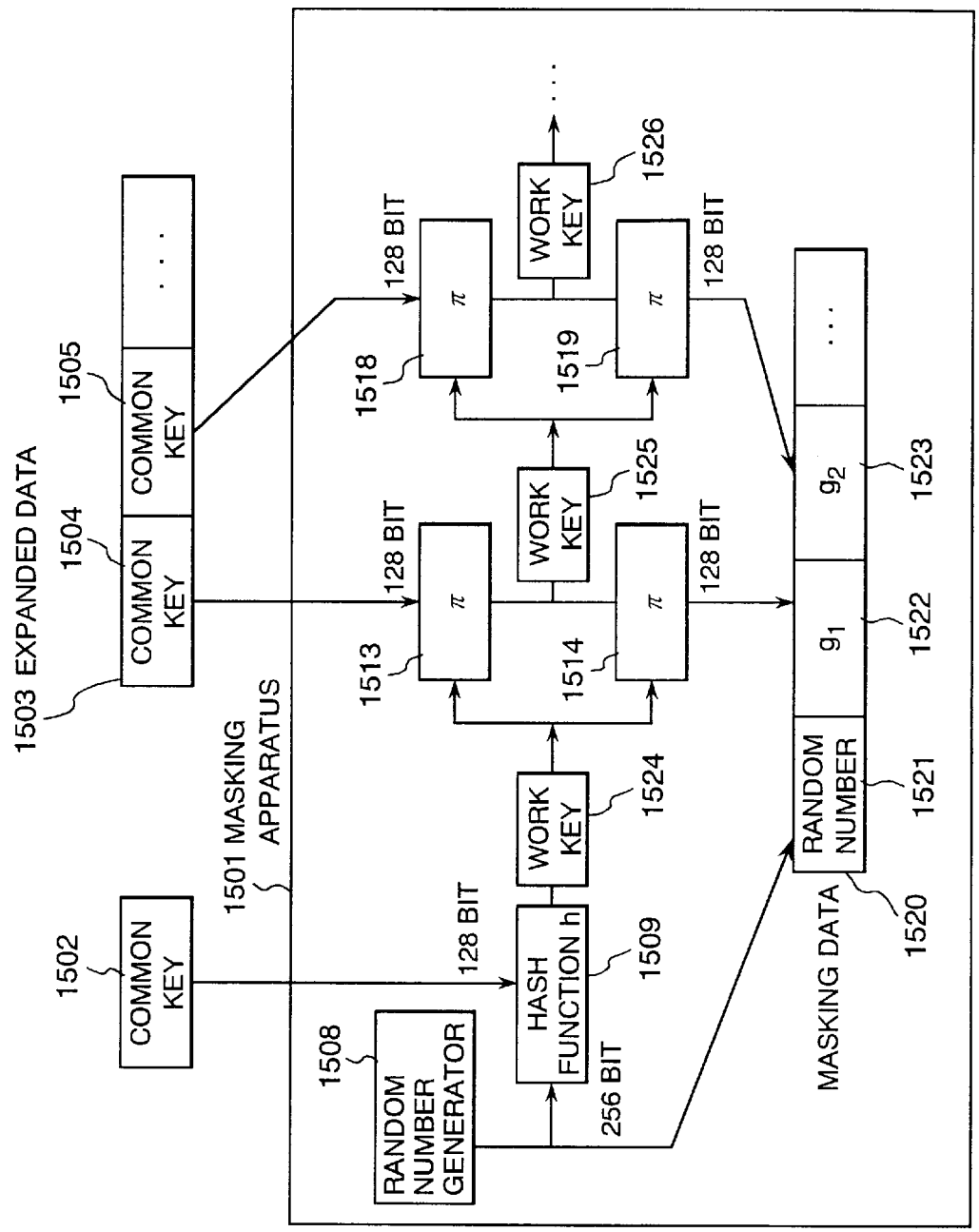
FIG. 15 is a diagram illustrating a construction example of a masking apparatus according to further another embodiment of the invention.

FIG. 15 is a diagram showing further another embodiment of the invention. In FIG. 15, a common key 1502 of 128 bits and expanded data 1503 are inputted to a masking apparatus 1501. The expanded data 1503 consists of (N) common keys 1502. In the masking apparatus 1501, a random number 1521 is generated by a random number generator 1508. Data obtained by connecting the random number 1521 and the common key 1502 is inputted to a hash function h 1509 and an output value of the hash function h 1509 serves as a work key 1524. When a first division 1504 as first 128-bit data of the expanded data 1503 is inputted, it is transformed by a $\pi$ function 1513 by using data of a part of the work key 1524 as a parameter, thereby obtaining a work key 1525 of 128 bits. The $\pi$ function 1513 executes the processes as shown in FIG. 14. $\pi$ functions 1513, 1518, and 1519 which will be described hereinlater execute processes in a similar manner. The work key 1525 is transformed by a $\pi$ function 1514 by using data of a part of the work key 1524 as a parameter, thereby obtaining data $H_1$ 1522 of 128 bits. When a second division 1505 of the next 128 bits in the expanded data 1503 is inputted, the second division 1505 is transformed by the $\pi$ function 1518 by using the work key 1525 as a parameter, thereby obtaining a work key 1526 of 128 bits. The work key 1526 is transformed by the $\pi$ function 1519 by using the work key 1525 as a parameter, thereby obtaining data g2 1523 of 128 bits. In such a manner, the whole expanded data 1503 is transformed and masking data 1520 is outputted.

In the embodiment, the masking data 1520 can be regarded as data obtained by expanding the common key 1502. The masking data 1520 can be also regarded as data obtained by enciphering the expanded data 1503 with the common key 1502. Actually, by executing the processes inverse to those of FIG. 15, the expanded data 1503 can be decoded by inputting the common key 1502 and the masking data 1520.

Although the length of the common key 1502 is 128 bits in the embodiment, the common key 1502 can also has an arbitrary length. The n function acts twice on each of the data blocks 1504, 1505, . . . of the expanded data 1503 in the embodiment, however, it can also act (N) times generally.

Figure 16:
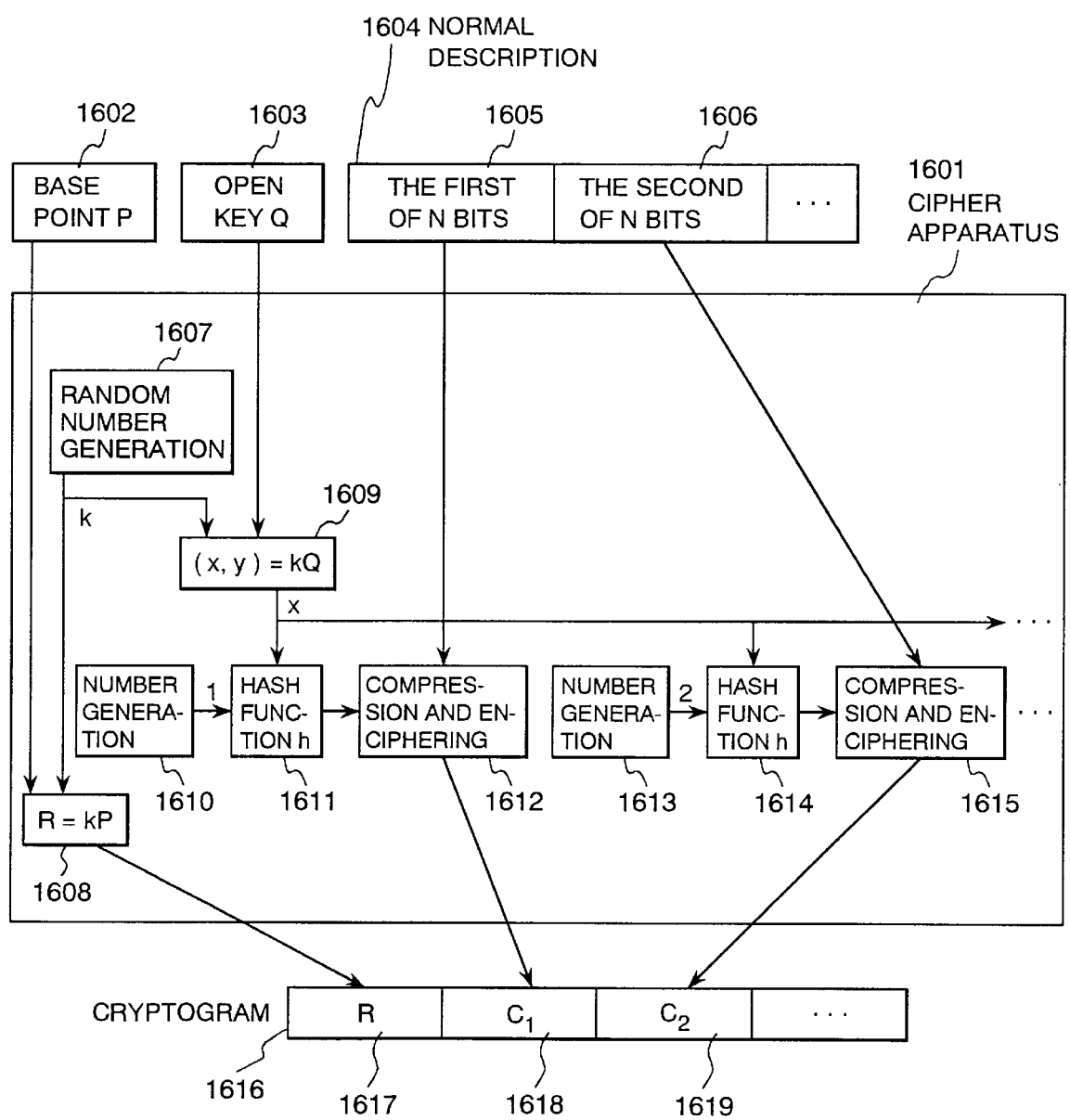
FIG. 16 is a diagram illustrating a construction example of a cipher apparatus according to further another embodiment of the invention.

FIG. 16 is a diagram showing further another embodiment of the invention. In FIG. 16, a base point P 1602, an open key Q 1603, and a normal description 1604 as parameters in an elliptic cipher are inputted to a cipher apparatus 1601.

The elliptic cipher here denotes an open key cipher generated by defining addition $(x_1, y_1)+(x_2, y_2)$ or calculation of integer times $k(x_1, y_1)$ or the like of two points $(x_1, y_1)$ and $(x_2, y_2)$ on an elliptic curve $(y^2=x^3+ax+b)$. The base point P 1602 and the open key Q 1603 are also points on the elliptic curve and satisfy the following relation with a secret key d 1802 which will be described hereinlater.

Q=dP

In the cipher apparatus 1601, random numbers k are generated by a random number generating function 1607.

The random number k and the base point P 1602 are inputted to an integer times calculating function 1608, R=kP is calculated, and R 1616 is generated. The random number k and the open key Q 1603 are inputted to the integer times calculating function 1609 and (x, y)=kQ is calculated, and the numerical value x on the x coordinate is outputted.

A number generating function 1610 generates a sequence number "1" and a hash function h 1611 generates a hash value from data obtained by connecting the sequence number "1" and the numerical value x. By using the hash value as a key, a compression and enciphering function 1612 compresses and enciphers first N bits 1605 of the normal description 1604. The compressed and enciphered data is generated as data $c_1$ 1618.

A number generating function 1613 generates a sequence number "2" and a hash function h 1614 generates a hash value from data obtained by connecting the sequence number "2" and the numerical value x. By using the hash value as a key, a compression and enciphering function 1615 compresses and enciphers next N bits 1606 of the normal description 1604. The compressed and enciphered data is outputted as $c_2$ 1619. Such processes are repeated and the whole normal description 1604 is transformed. Thus, a cryptogram 1616 can be obtained.

Figure 17:
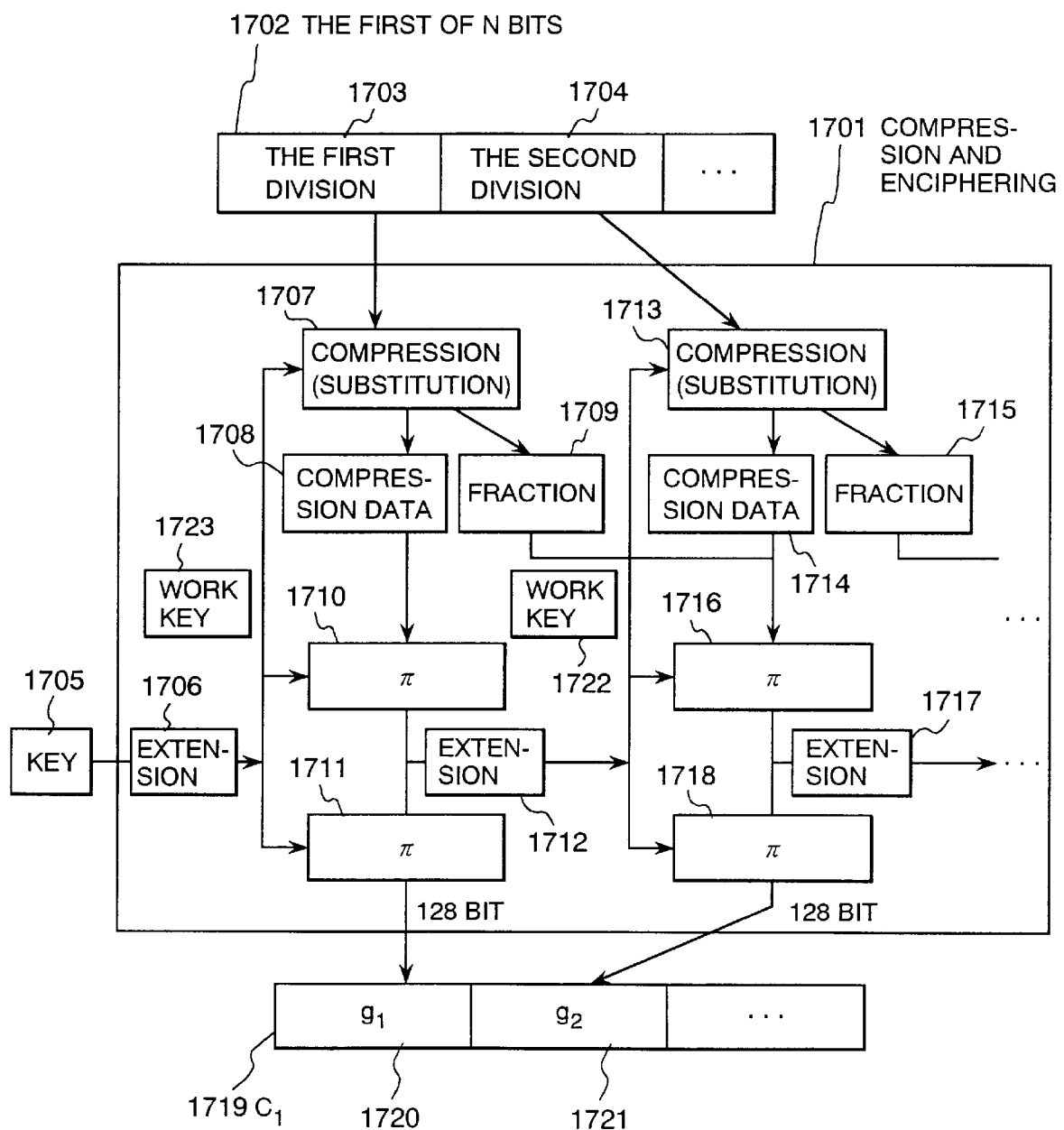
FIG. 17 is a diagram illustrating a construction example of a compression and enciphering function in the cipher apparatus of FIG. 16.

FIG. 17 shows the details of the compression and enciphering function 1612 in FIG. 16. In a compression and enciphering function 1701, when a key 1705 is inputted, an extending function 1706 copies the key 1705 to obtain a plurality of keys. The plurality of keys are connected and generated as a work key 1723. When a first division 1703 of first N bits 1702 is inputted, a compression (substitution) process 1707 is performed by using data of a part of the work key 1723 and compressed data 1708 of 128 bits and a fraction 1709 are outputted. As the compression (substitution) process 1707, for example, Huffman compression is used. Similarly, the Huffman compression is also used as a compression (substitution) process 1713 which will be described hereinlater. Compressed data 1708 of 128 bits is transformed by a π function 1710 by using data of a part of the work key 1723 as a parameter. The data obtained by the transformation is extended by an extending function 1712 and the resultant data is outputted as a work key 1722. The π function 1710 performs the processes as shown in FIG. 14. π functions 1711, 1716, and 1718 which will be described hereinlater execute processes in a similar manner.

An output of the π function 1710 is transformed by the π function 1711 by using data of a part of the work key 1723 as a parameter, thereby obtaining $g_1$ 1720 of 128 bits. When a second division 1704 of the normal description 1702 is inputted, the compression (substitution) process 1713 is performed by using a part of the work key 1722 as a parameter and compressed data 1714 of 128 bits and a fraction 1715 are outputted. The length of data obtained by connecting the fraction 1709 and the compressed data 1714 is equal to 128 bits. The data obtained by connecting the fraction 1709 and the compressed data 1714 is transformed by the π function 1716 by using a part of the work key 1722 as a parameter and the result of the transformation is extended by an extending function 1717. The output of the π function 1716 is transformed by the π function 1718 by using data of a part of the work key 1722 as a parameter, thereby obtaining data $g_2$ 1721 of 128 bits. When all of the first (N) bits 1702 is transformed by repeating the above operations, data $c_1$ 1719 is obtained as a result of the transformation.

The embodiment is similar to an open key cipher like conventionally used RSA with respect to the point that the normal description 1604 is transformed to the cryptogram 1616 by using the open key Q 1603. However, for an ordinary normal description which can be compressed by the Huffman compression or the like, it is different from the conventional open key cipher with respect to the point that the length of the cryptogram 1616 is shorter than that of the normal description 1604. Although the π function acts twice on each of the 128-bit compressed data 1708, the fraction 1709, the compressed data 1714, . . . in FIG. 17, generally, it can also act (N) times.

Figure 18:
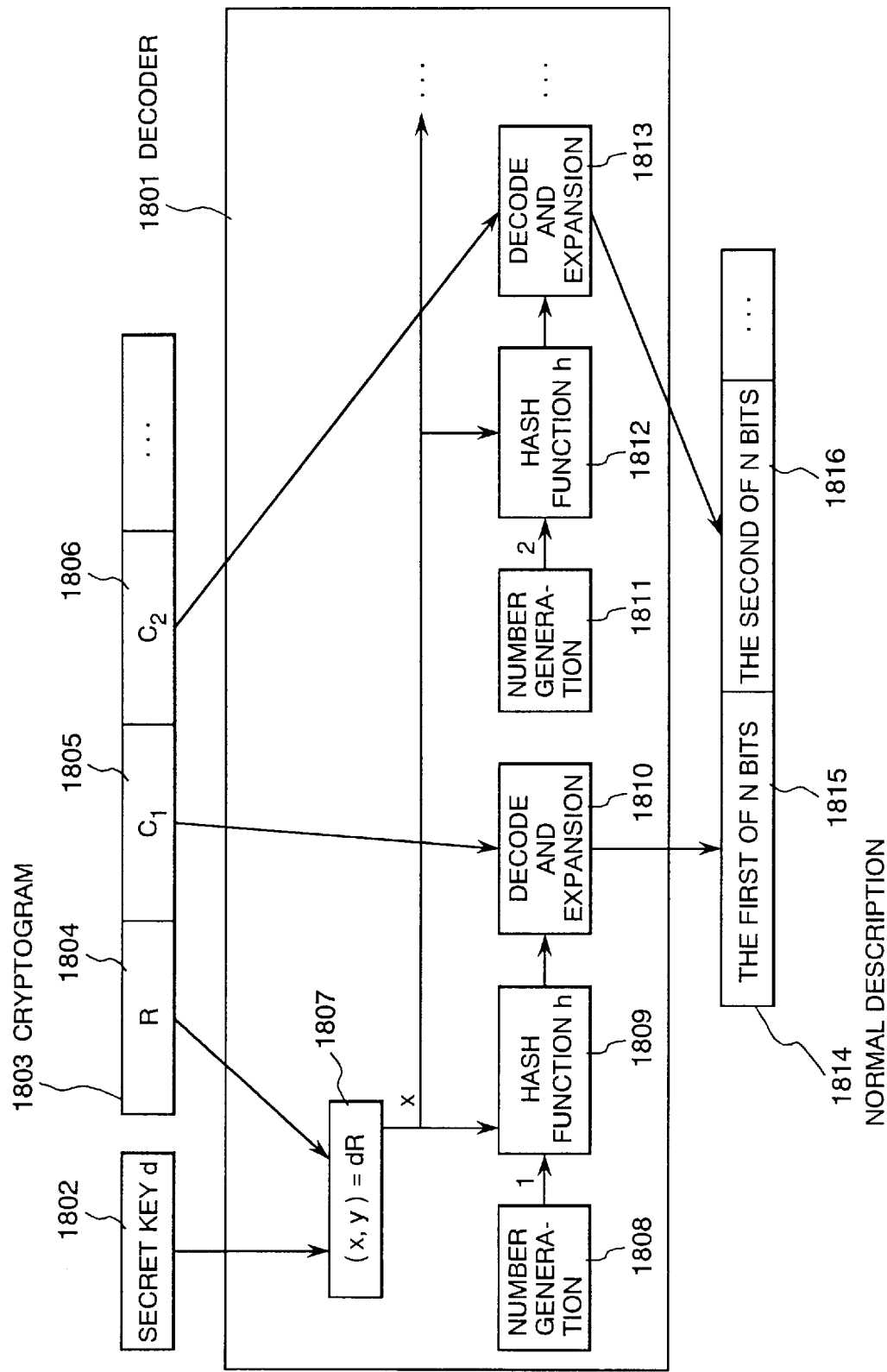
FIG. 18 is a diagram illustrating a construction example of a decoder according to further another embodiment of the invention.

FIG. 18 is a diagram showing further another embodiment of the invention. In FIG. 18, a secret key 1802 as a parameter in the elliptic cipher and a cryptogram 1803 are inputted to a decoder 1801.

In the decoder 1801, the secret key 1802 and R 1804 in the cryptogram 1803 are inputted to an integer times calculating function 1807, (x, y)=dR is calculated, and a numerical value x on the x coordinate is outputted.

A number generating function 1808 generates a sequence number "1". A hash function h 1809 generates a hash value from data obtained by connecting the sequence number "1" and the numerical value x and the hash value is outputted. A decoding and expanding function 1810 decodes and expands data $c_1$ 1805 in the cryptogram 1803. The decoded and expanded data is generated as first (N) bits 1815.

A number generating function 1811 generates a sequence number "2". A hash function h 1812 generates a hash value from data obtained by connecting the sequence number "2" and the numerical value x and the hash value is outputted. By using the hash value as a key, a decoding and expanding function 1813 decodes and expands data $c_2$ 1806 in the cryptogram 1803. The decoded and expanded data is generated as next (N) bits 1816. The whole cryptogram 1803 is transformed by repeating the above operations, thereby obtaining a normal description 1814.

Figure 19:
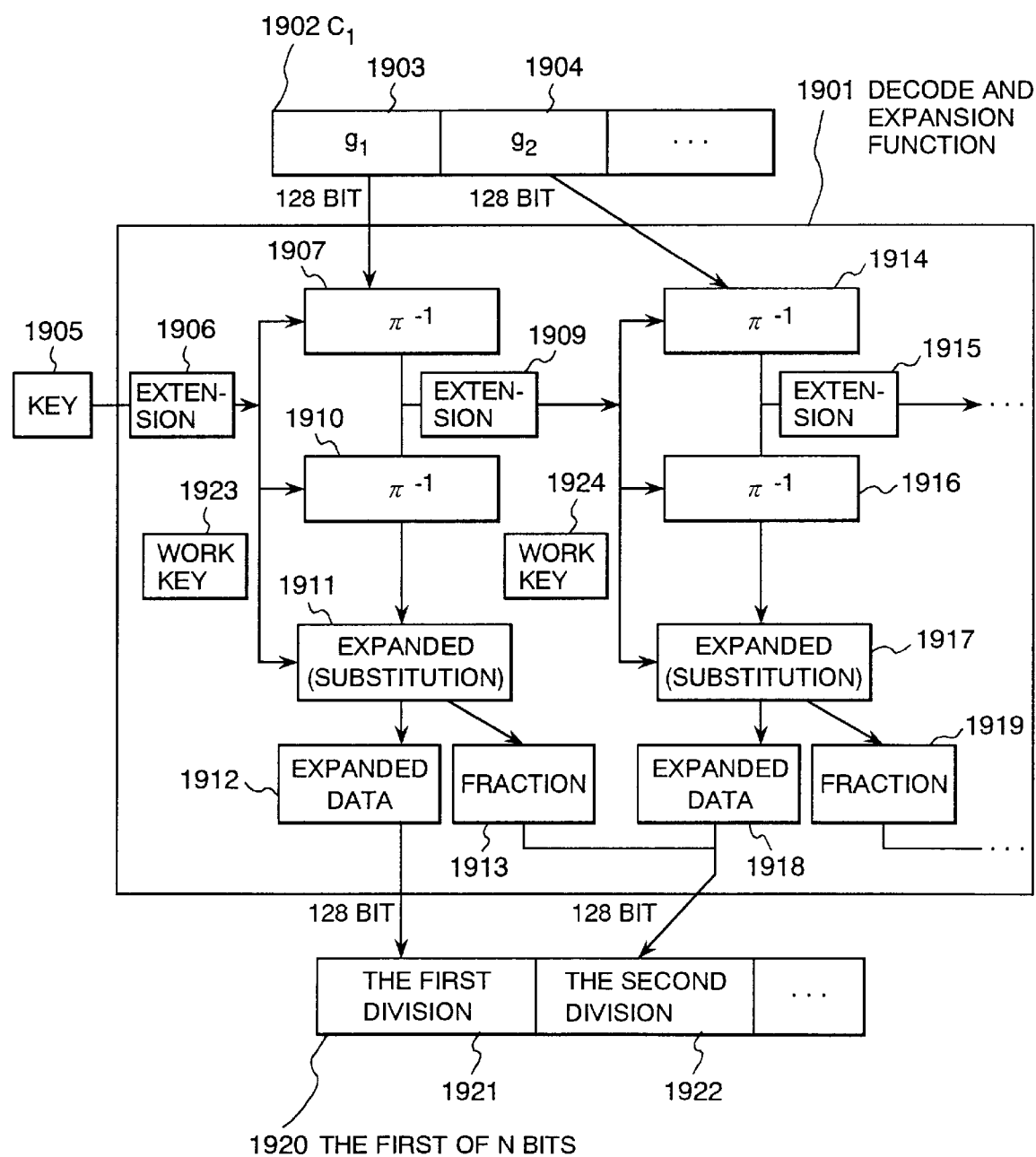
FIG. 19 is a diagram illustrating a construction example of a decoding and expanding function in the decoder of FIG. 18.

FIG. 19 shows the details of the decoding and expanding function 1810 in FIG. 18. In the decoding and expanding function 1810, when a key 1905 is inputted, an extending function 1906 copies the key 1905, thereby obtaining a plurality of keys. The plurality of keys are connected and outputted as a work key 1923. When data $g_1$ 1903 in data $c_1$ 1902 is inputted, it is transformed by a $\pi^{-1}$ function 1907 by using data of a part of the work key 1923 as a parameter. The result of the transformation is extended by an extending function 1909 and the resultant data is generated as a work key 1924. The $\pi^{-1}$ function 1907 is an inverse function of the π function 1711 in FIG. 17. That is, in a case where the same parameter is set to each of the π function 1711 and the $\pi^{-1}$ function 1907, when data π(m) obtained by transforming data (m) by the π function 1711 is further transformed by the $\pi^{-1}$ function 1907, the original data (m) is obtained. That is, the following equation is satisfied.

m=$\pi^{-1}$(π(m))

The output of the $\pi^{-1}$ function 1907 is transformed by a $\pi^{-1}$ function 1910 by using data of a part of the work key 1923 as a parameter and the resultant data is outputted. The output is expanded by an expansion (substitution) function 1911 by using data of a part of the work key 1923 as a parameter, thereby obtaining expanded data 1912 and a fraction 1913. The expanded data 1912 is outputted as a first division 1921.

The expansion (substitution) function 1911 is the inverse transformation of the compression (substitution) function 1707 in FIG. 17. That is, when the same parameter is set in each of the compression (substitution) function 1707 and the expansion (substitution) function 1911, data obtained by transforming data (m) by the compression (substitution) function 1707 is further transformed by the expansion (substitution) function 1911, thereby obtaining the original data.

When data $g_2$ 1904 in the data $c_1$ 1902 is inputted, it is transformed by a $\pi^{-1}$ function 1914 by using data of a part of the work key 1924 as a parameter and the result of the transformation is extended by an extending function 1915.

The output of the $\pi^{-1}$ function 1914 is transformed by a $\pi^{-1}$ function 1916 by using data of a part of the work key 1924 as a parameter and the resultant data is outputted. The output is expanded by the expansion (substitution) function 1917 by using data of a part of the work key 1924 as a parameter, thereby obtaining expanded data 1918 and a fraction 1919. Data derived by connecting the fraction 1913 obtained by the previous operation and the expanded data 1912 obtained by the operation of this time is outputted as a second division 1922. The whole data $c_1$ 1902 is transformed by repeating such operations, thereby obtaining first (N) bits 1920.

In the embodiment, the cryptogram 1803 is similar to the open key cipher such as conventionally used RSA with respect to a point that it is decoded to the normal description 1814 by using the secret key d 1802. However, the cryptogram compressed by the Huffman compression or the like is different from the conventional open key cipher with respect to a point that the length of the decoded data is longer than that of data before decoding operation.

Figure 20:
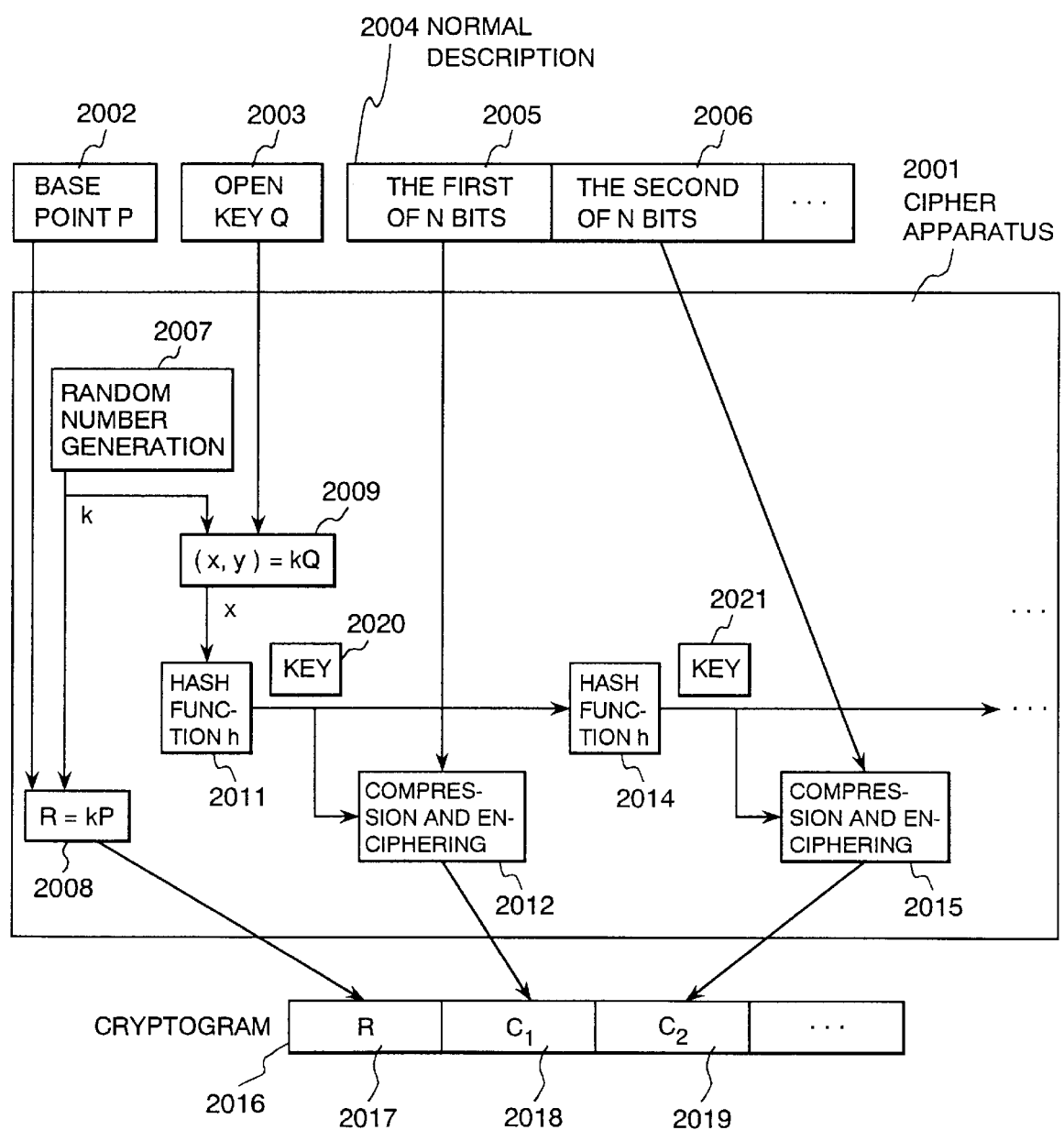
FIG. 20 is a diagram illustrating a construction example of a cipher apparatus according to further another embodiment of the invention.
Figure 21:
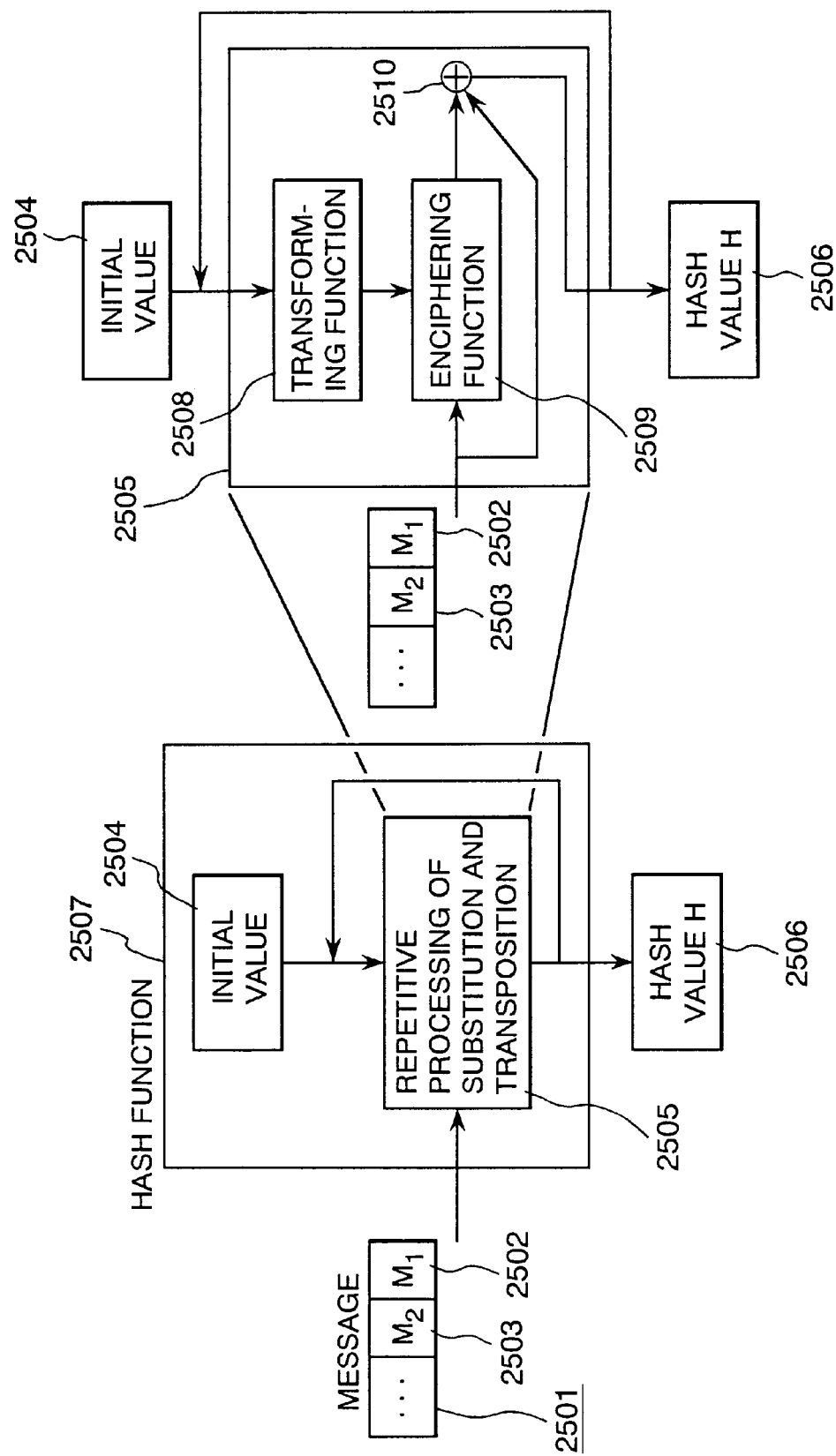
FIG. 21 is a diagram showing the construction of a conventional apparatus.

FIG. 20 is a diagram showing further another embodiment of the invention. In FIG. 20, a base point P 2002 and an open key Q 2003 as parameters in the elliptic cipher and a normal description 2004 are inputted to a cipher apparatus 2001.

In the cipher apparatus 2001, random numbers k are generated by a random number generating function 2007. The random number k and the base point P 2002 are inputted to an integer times calculating function 2008, R=kP is calculated, and a cryptogram R 2016 is outputted. The random number k and the open key Q 2003 are inputted to an integer times calculating function 2009, (x, y)=kQ is calculated, and the numerical value x on the x coordinate is outputted.

A hash function h 2011 generates a hash value for the numerical value x and outputs the hash value as a key 2020. A compression and enciphering function 2012 compresses and enciphers first N bits 2005 of the normal description 2004 by using the key 2020. Data obtained by the compression and enciphering is outputted as $c_1$ 2018.

A hash function h 2014 generates a hash value for the key 2020 and outputs the hash value as a key 2021. A compression and enciphering function 2015 compresses and enciphers next (N) bits 2006 in the normal description 2004 by using the key 2021. The result of the compression and enciphering is outputted as data $c_2$ 2019. The whole normal description 2004 is transformed by repeating the above processes, thereby obtaining the cryptogram 2016.

The embodiment is similar to the open key cipher such as conventionally used RSA with respect to a point that the normal description 2004 is transformed to the cryptogram 2016 by using the open key Q 2003. However, for an ordinary normal description which can be compressed by the Huffman compression or the like, it is different from the conventional open key cipher with respect to a point that the length of the cryptogram 2016 is shorter than that of the normal description 2004.

What is claimed is:

1. A masking data generating method of transforming input data having an arbitrary length to data having an arbitrary length so that the resultant data is difficult to be inversely transformed, comprising:

generating a hash value of data generated from the input data and random number data;

executing a one to one transformation to a part of the input data by using the hash value as a parameter and outputting the intermediate generation data as a part of masking data; and executing the one to one transformation to a part of the input data by using intermediate generation data obtained during the one to one transformation.

2. An open key enciphering method of inputting an open key and a normal description and outputting a cryptogram, comprising:

generating a random number;

compressing or enciphering a part of the normal description by using data, as a parameter, obtained by acting on a random number generated in the random number generating step and the open key; and compressing or enciphering another part of the normal description by using data obtained during the compressing or enciphering transformation as a parameter.

3. The method according to claim 2, wherein when a secret key and the cryptogram are inputted and the normal description is outputted, data obtained by acting on a part of the cryptogram and the secret key is used as a parameter to decode or expand another part of the cryptogram and, after that, data obtained during the decoding or expanding transformation is used as a parameter to decode or expand another part of the cryptogram.

4. An open key enciphering method of inputting an open key and a normal description and outputting a cryptogram, comprising:

generating a random number;

compressing or enciphering a part of the normal description by using data, as a parameter, obtained by transforming data by a hash function, which is derived by acting on a random number generated in the random number generating step and the open key; and compressing or enciphering another part of the normal description by using data obtained during the compressing or enciphering transformation as a parameter.

5. An open key enciphering apparatus for inputting an open key and a normal description and outputting a cryptogram, comprising:

random number generating means;

means for compressing or enciphering a part of the normal description by using data, as a parameter, obtained by acting on a random number generated in the random number generating step and the open key; and means for compressing or enciphering another part of the normal description by using data obtained during the compressing or enciphering transformation as a parameter.

6. The apparatus according to claim 5, wherein when a secret key and the cryptogram are inputted and the normal description is outputted, data obtained by acting on a part of the cryptogram and the secret key is used as a parameter and another part of the cryptogram is decoded or expanded and, after that, data obtained during the decoding or expanding transformation is used as a parameter and another part of the cryptogram is further decoded or expanded.

7. An open key enciphering apparatus for inputting an open key and a normal description and outputting a cryptogram, comprising:

random number generating means;

means for transforming data by a hash function, which is derived by acting on a random number generated by the random number generating means and the open key and compressing or enciphering a part of the normal description by using the derived data as a parameter; and means for compressing or enciphering another part of the normal description by using data obtained during the compressing or enciphering transformation as a parameter.

* * * * *